(12) United States Patent
Tamura et al.

(10) Patent No.: US 6,661,129 B2
(45) Date of Patent: Dec. 9, 2003

(54) LINEAR MOTOR

(75) Inventors: Shinya Tamura, Osaka (JP);
Yoshikazu Kinashi, Kobe (JP);
Tsugumitsu Suehiro, Katano (JP)

(73) Assignee: Matsushita Electric Industrial Co., Ltd. (JP)

( * ) Notice: Subject to any disclaimer, the term of this patent is extended or adjusted under 35 U.S.C. 154(b) by 75 days.

(21) Appl. No.: 10/091,568

(22) Filed: Mar. 7, 2002

(65) Prior Publication Data

US 2002/0130562 A1 Sep. 19, 2002

(30) Foreign Application Priority Data

| Mar. 16, 2001 | (JP) | 2001-075794 |
| Jun. 27, 2001 | (JP) | 2001-193820 |
| Oct. 2, 2001 | (JP) | 2001-305893 |

(51) Int. Cl.[7] ............................................... H02K 41/00
(52) U.S. Cl. ............................ 310/12; 310/12; 310/13; 310/15
(58) Field of Search .................................... 310/12, 13

*Primary Examiner*—Nestor Ramirez
*Assistant Examiner*—Iraj A. Mohandesi
(74) *Attorney, Agent, or Firm*—Parkhurst & Wendel, L.L.P.

(57) ABSTRACT

Provided as a voice coil-type linear motor is a linear motor which achieves relatively high output power, small size and light weight, high thrust, and high efficiency, such as to be available as an industrial linear motor. Ends of inside yokes are coupled by means of auxiliary yokes, outside yokes are configured such that inner peripheral surfaces of magnets are of different magnetic poles, a closed magnetic path is formed by the inside yokes, auxiliary yokes, outside yokes, and magnets. By feeding current to coils, magnetic action is caused to occur between a magnetic field generated by the closed magnetic path and the coils, so that the outside yokes and the inside yokes may move relative to each other.

17 Claims, 15 Drawing Sheets

(a)

(b)

LINEAR MOTOR

FIELD OF THE INVENTION

The invention relates to an industrial linear motor having relatively high output power among linear motors.

BACKGROUND OF THE INVENTION

A voice coil type of linear motor is used for linear actuators, which are used for moving a magnetic head and an optical pickup and the like in information storage devices. Many of these linear motors are of a movable coil type.

One example of the conventional voice coil-type linear motors is shown in FIG. 15.

A cylinder-shaped outside yoke 101 of which one side end is open configures a fixed side, and a radially magnetized magnet 102 is provided in the inside of the outside yoke 101, and a cylinder-shaped inside yoke 103 is supported so as to be able to coaxially slide with respect to the outside yoke 101 in the direction of an arrow J. The inside yoke 103 is supported by a guide roller 106 with respect to a guide 105 so that a gap between the magnet 102 and a coil 104 may be held uniform.

When electric current is fed through the coil 104, the inside yoke 103 moves in the direction of the arrow J with respect to the outside yoke 101 in accordance with Fleming's left hand rule based on the direction of the current flowing through the coil 104 and the direction of a magnetic flux φ of the magnets 102 inter-linking with the current.

However, the above conventional configuration is suitable for use in applications needing small thrust such as information storage devices. However, when used for industrial applications requiring large thrust, may be poor in volume efficiency or problematic in magnetic efficiency.

Concretely, in the conventional configuration, the configuration of the magnetic circuit requires the outside yoke 101 to coaxially cover the whole inside yoke 103, thus resulting in small thrust per unit volume and heavy weight.

Also, it requires an open side end portion of the outside yoke or a slit provided in the outside yoke to permit free motion of the coil.

DISCLOSURE OF THE INVENTION

The invention has an object to provide a linear motor that, despite a voice coil-type linear motor, permits such relatively high output power, small size and light weight, high thrust, and high efficiency as to be available as an industrial linear motor.

A linear motor according claim 1 of the invention is configured with a plurality of voice coil-type linear motor units arranged in parallel to each other, characterized in that each of the voice coil-type linear motor units comprises an outside yoke having a cylindrical hollow portion, an inside yoke passing through the hollow portion of the outside yoke, a coil wound around the inside yoke along the axial direction thereof, and a magnet mounted to the inside of the hollow portion of the outside yoke and magnetized to a single pole in the surface facing the coil, wherein the ends of the inside yoke are coupled to an adjacent one of the voice coil-type linear motor units by means of auxiliary yokes, the outside yokes of the voice coil-type linear motor units adjacent to each other are configured such that the inner peripheral surfaces of the magnets may be of different magnetic poles, and thus a closed magnetic path is formed by the inside yokes adjacent to each other, the auxiliary yokes, the outside yokes, and the magnets, whereby, by feeding current through the coils of the voice coil-type linear motor units adjacent to each other, the outside yokes and the inside yokes are effected to move relative to each other based on magnetic action of a magnetic field generated by the closed magnetic path and the coils.

A linear motor according to claim 2 of the invention is configured with a plurality of voice coil-type linear motor units arranged in parallel to each other, characterized in that each of the voice coil-type linear motor units comprises an outside yoke, having a cylindrical hollow portion, an inside yoke, passing through the hollow portion of the outside yoke, a coil mounted to the inside of the hollow portion of the outside yoke and wound along the axial direction of the inside yoke, and a magnet mounted to the inside yoke and magnetized to a single pole in the surface facing the coil, wherein the ends of the inside yoke are coupled to another adjacent above-described voice coil-type linear motor unit by mean of auxiliary yokes, the inside yokes of the voice coil-type linear motor units adjacent to each other are configured such that the outer peripheral surfaces of the magnets may be of different magnetic poles, and thus a closed magnetic path is formed by the inside yokes adjacent to each other, the auxiliary yokes, the outside yokes, and the magnets, and thereby, by feeding current through the coils of the voice coil-type linear motor units adjacent to each other, the outside yokes and the inside yokes are effected to move relative to each other based on magnetic action caused to occur between a magnetic field generated by the closed magnetic path and the coils.

A linear motor according to claim 3 of the invention is configured with a plurality of voice coil-type linear motor units arranged in parallel to each other, characterized in that it comprises inside yokes arranged side by side, coils separately wound in a plurality of sections around the inside yokes along the respective axial directions thereof, and outside yokes having cylindrical hollow portions, into which the inside yokes are inserted, and provided with magnets on the insides of the hollow portions correspondingly to the coils separately wound in the plurality of sections, wherein the magnets are magnetized to a single pole in the surfaces facing the coils, and the outside yokes of the voice coil-type linear motor units adjacent to each other are configured such that the inner peripheral surfaces of the magnets may be of different magnetic poles, and thus a closed magnetic path is formed by a plurality of the outside yokes, the inside yokes, and the magnets, and thereby, by feeding current through the coils, the outside yokes coupled and the inside yokes coupled are effected to move relative to each other based on magnetic action caused to occur between a magnetic field generated by the closed magnetic path and a magnetic field generated by the coils.

A linear motor according to claim 4 of the invention is configured with a plurality of voice coil-type linear motor units arranged in parallel to each other, characterized in that it comprises inside yokes arranged side by side, magnets separately provided in a plurality of sections on the inside yokes along the respective axial directions thereof, and outside yokes having cylindrical hollow portions, into which the inside yokes are inserted, and having coils wound on the insides of the hollow portions correspondingly to the magnets separately provided in the plurality of sections, wherein the magnets are magnetized to a single pole in the surfaces facing the coils and are configured such that the magnets of the voice coil-type linear motor units adjacent to each other may be of different magnetic poles, and thus a closed magnetic path is formed by the outside yokes, the inside yoke, and the magnets, and thereby, by feeding current through the coils, the outside yokes coupled and the inside yokes coupled are effected to move relative to each other based on magnetic action caused to occur between a magnetic field generated by the closed magnetic path and a magnetic field generated by the coils.

A linear motor according to claim 5 of the invention is characterized in that it comprises a movable unit comprising an outside yoke having a cylindrical hollow portion and an annular magnet fixed so as to cover nearly all surface of the inner peripheral surface of the hollow portion, and a fixed unit comprising a column-shaped inside yoke and a coil wound around an outer periphery portion thereof, wherein a plurality of pairs of each of the movable unit and the fixed unit are arranged side by side, opposite ends of the plurality of the fixed units are coupled by individual auxiliary yokes, and the outside yokes are face-joined to each other such that the inner peripheral surfaces of the magnets of the movable units adjacent to each other may be of different magnetic poles, and guide mechanisms for holding nearly uniform gaps between the outer periphery portions of the coils and the inner peripheral surfaces of the magnets are provided between the sides of the auxiliary yokes and the outside yokes.

A linear motor according to claim 6 of the invention is characterized in that it comprises a movable unit comprising an outside yoke having a cylindrical hollow portion and an annular magnet fixed so as to cover nearly all surface of the inner peripheral surface of the hollow portion, and a fixed unit comprising a column-shaped inside yoke and coils separately wound in two sections around the outer periphery portion of the inside yoke, wherein the fixed units are arranged side by side, four movable units are mounted to face the coils of four sections such that the inner peripheral surfaces of the magnets adjacent to each other may be of different magnetic poles, and opposite ends of the fixed units are coupled by coupling blocks, the outside yokes of two sets of the movable units arranged side by side are face-joined to each other, and the linear motor further comprises holding means for coupling the two face-joined movable units to hold a constant spacing of one movable stroke between them, and guide mechanism, provided between the side of the coupling block and the outside yokes, for holding nearly uniform gaps between the outer periphery portions of the coils and the inner peripheral surfaces of the magnets.

A linear motor according to claim 7 of the invention is characterized in that it comprises a fixed unit comprising an outside yoke having a cylindrical hollow portion and an annular magnet fixed so as to cover nearly all surface of the inner peripheral surface of the hollow portion, and a movable unit comprising a column-shaped inside yoke and coils wound around the outer periphery portion thereof, wherein a plurality of pairs of each of the movable unit and the fixed unit are arranged side by side, opposite ends of the plurality of the movable units are coupled by individual auxiliary yokes, and the outside yokes are face-joined to each other such that the inner peripheral surfaces of the magnets of the fixed units adjacent to each other may be of different magnetic poles, and guide mechanisms for holding nearly uniform gaps between the outer periphery portions of the coils and the inner peripheral surfaces of the magnets are provided between the side of the auxiliary yokes and the outside yokes.

A linear motor according to claim 8 of the invention is characterized in that it comprises a fixed unit comprising an outside yoke having a cylindrical hollow portion and an annular magnet fixed so as to cover nearly all surface of the inner peripheral surface of the hollow portion, and a movable unit comprising a column-shaped inside yoke and coils wound separately in two sections around the outer periphery portion of the inside yoke, wherein the movable units are arranged side by side, four fixed units are mounted to face the coils of four sections such that the inner peripheral surfaces of the magnets adjacent to each other may be of different magnetic poles, opposite ends of the movable units are coupled by coupling blocks, and the outside yokes of two sets of the fixed units arranged side by side are face-joined to each other, and the linear motor further comprises holding means for coupling between two face-joined movable units to hold a constant spacing of one movable stroke between them, and guide mechanisms, provided between the sides of the coupling blocks and the outside yokes, for holding nearly uniform gaps between the outer periphery portions of the coils and the inner peripheral surfaces of the magnets.

A linear motor according to claim 9 of the invention is characterized in that, in any one of claims 5 to 8, the magnets are divided into a plurality of parts to be fixed on the inner peripheral surface of the hollow portion.

A linear motor according to claim 10 of the invention is characterized in that, in any one of claims 5 to 8, the magnet is shaped like a plate, and the inside yoke is shaped like a hexagonal or octagonal prism.

A linear motor according to claim 11 of the invention is characterized in that, in any one of claims 5 to 8, the outside yoke is configured as a lamination of electrical sheets.

A linear motor according to claim 12 of the invention is characterized in that, in any one of claims 5 to 8, the outside yoke is divided into two parts along the radial direction.

A linear motor according to claim 13 of the invention is characterized in that it comprises an outside yoke having a plurality of cylindrical hollow portions extending side by side with each other, a plurality of column-shaped inside yokes passing through the hollow portions of the outside yoke, coil wound around the inside yokes along the axial directions thereof, and magnets mounted to the insides of the hollow portions of the outside yoke and-magnetized to a single pole in the surfaces facing to the coils, wherein the opposite ends of the inside yokes are coupled by auxiliary yokes, the magnets provided in the hollow portions adjacent to each other are arranged such that the inner peripheral surfaces of the magnets may be of different magnetic poles, thus forming a closed magnetic path by the inside yokes, the auxiliary yokes, the outside yoke, and the magnets, and thereby, by feeding current through the coils, the outside yoke and the inside yokes are effected to move relative to each other based on magnetic action caused to occur between a magnetic field generated by the closed magnetic path and the coils.

A linear motor according to claim 14 of the invention is characterized in that it comprises an outside yoke having a plurality of cylindrical hollow portions extending side by side with each other, inside yokes passing through the hollow portions of the outside yoke, coils mounted to the insides of the hollow portions of the outside yoke and wound along the axial direction of the inside yokes, and magnets mounted to the inside yokes and magnetized to a single pole in the surfaces facing to the coils, wherein the opposite ends of the inside yokes are coupled by auxiliary yokes, the inside yokes adjacent to each other are configured such that the outer peripheral surfaces of the magnets may be of different magnetic poles, and thus a closed magnetic path is formed by the yokes adjacent to each other, the auxiliary yokes, the outside yoke, and the magnets, and thereby, by feeding current through the coils, the outside yoke and the inside yokes are effected to move relative to each other based on magnetic action caused to occur between a magnetic field generated by the closed magnetic path and the coils.

A linear motor according to claim 15 of the invention is configured with a plurality of voice coil-type linear motor units arranged in parallel to each other, characterized in that it comprises inside yokes arranged side by side, coils separately wound in a plurality of sections around the inside yokes along the respective axial directions thereof, and outside yokes having a plurality of cylindrical hollow portions extending side by side with each other and into which the inside yokes are inserted, and having magnets provided on the inside of the hollow portions correspondingly to the coils separately wound in the plurality of sections, wherein the magnets are magnetized to a single pole in the surfaces facing the coils, and the outside yokes of the voice coil-type linear motor units adjacent to each other are configured such that the inner peripheral surfaces of the magnets may be of different magnetic poles, and thus a closed magnetic path is formed by a plurality of the outside yokes, the inside yoke, and the magnets, and thereby, by feeding current through the coils, the outside yokes coupled and the inside yokes coupled are effected to move relative to each other based on magnetic action caused to occur between a magnetic field generated by the closed magnetic path and a magnetic field generated by the coils.

A linear motor according to claim 16 of the invention is configured with a plurality of voice coil-type linear motor units arranged in parallel to each other, characterized in that it comprises inside yokes arranged side by side, magnets separately provided in a plurality of sections on the inside yokes along the axial directions thereof, and outside yokes having cylindrical hollow portions into which the inside yokes are inserted, and having coils wound on the insides of the hollow portions correspondingly to the magnets separately provided in the plurality of sections, wherein the magnets are magnetized to a single pole in the surfaces facing the coils, and are configured such that the magnets of the voice coil-type linear motor units adjacent to each other may be of magnetic poles different from each other, and thus a closed magnetic path is formed by the outside yokes, the inside yokes, and the magnets, and thereby, by feeding current through the coils, the outside yokes coupled and the inside yokes coupled are effected to move relative to each other based on magnetic action caused to occur between a magnetic field generated by the closed magnetic path and a magnetic field generated by the coils.

An X-Y table according to claim 17 of the invention is characterized by equipping the linear motor according to any one of claims 1 to 8, and claims 13 to 16.

DESCRIPTION OF THE EMBODIMENTS

Hereinafter, each embodiment of the invention will be described with reference to FIG. 1 to FIG. 14.

(Embodiment 1)

FIG. 1 to FIG. 4 show the embodiment 1 of the invention.

Figure 1:
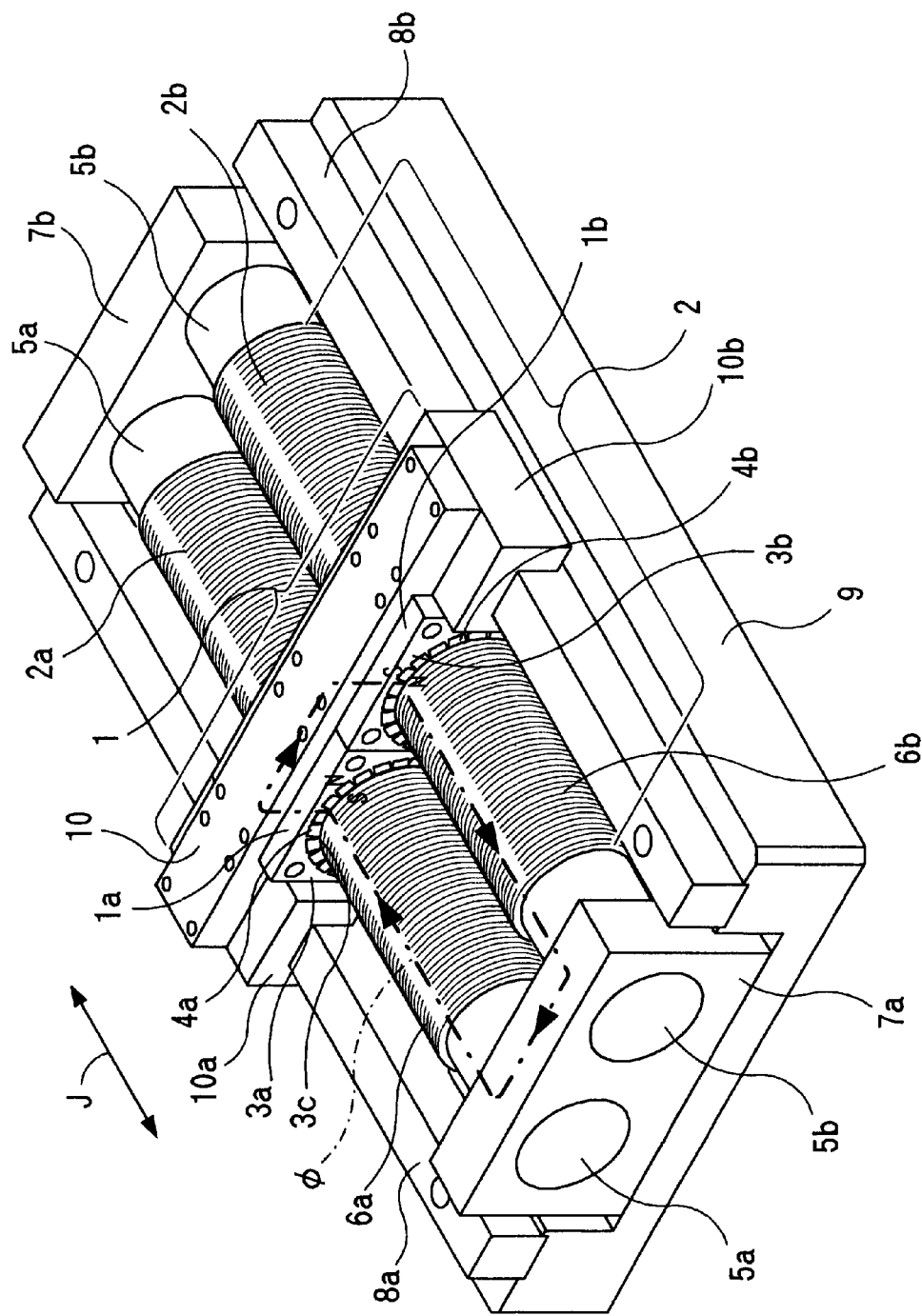
FIG. 1 is a perspective view of a linear motor according to Embodiment 1 of the invention.

FIG. 1 shows a linear motor according to the embodiment 1, which is configured as a parallel arrangement of a plurality of voice coil-type linear motor units. The linear motor is configured as a combination of a voice coil-type linear motor unit comprising a movable unit 1a and a fixed unit 2a and another voice coil-type linear motor unit comprising a movable unit 1b and a fixed unit 2b.

Figure 2:
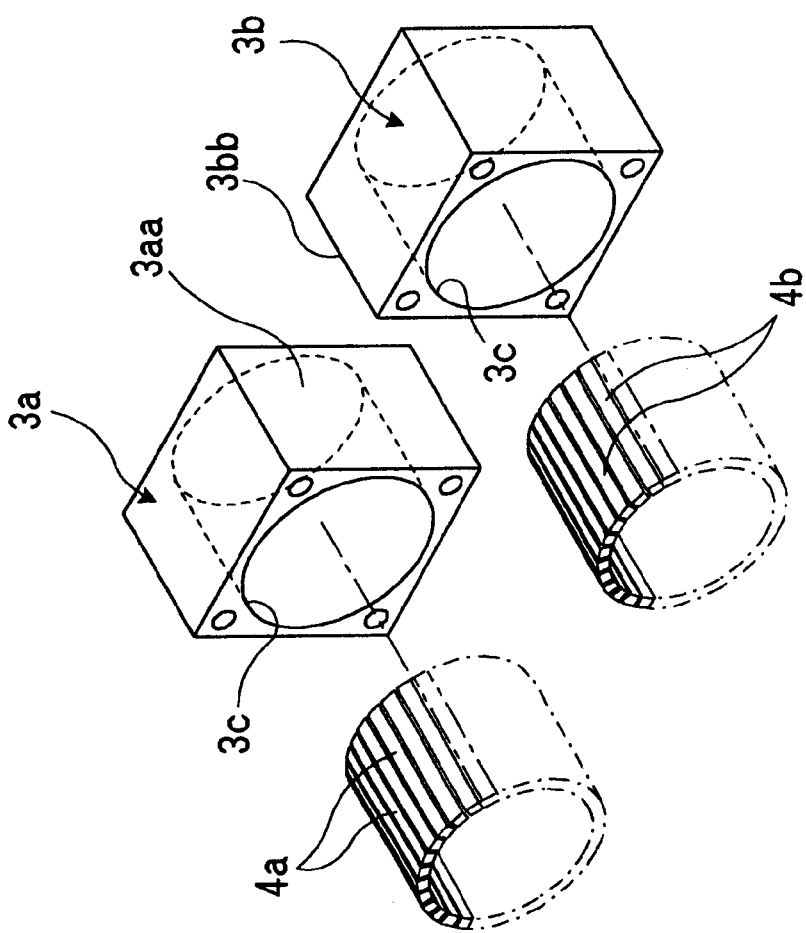
FIG. 2 is an exploded perspective view of an outside yoke according to the Embodiment 1.
Figure 3:
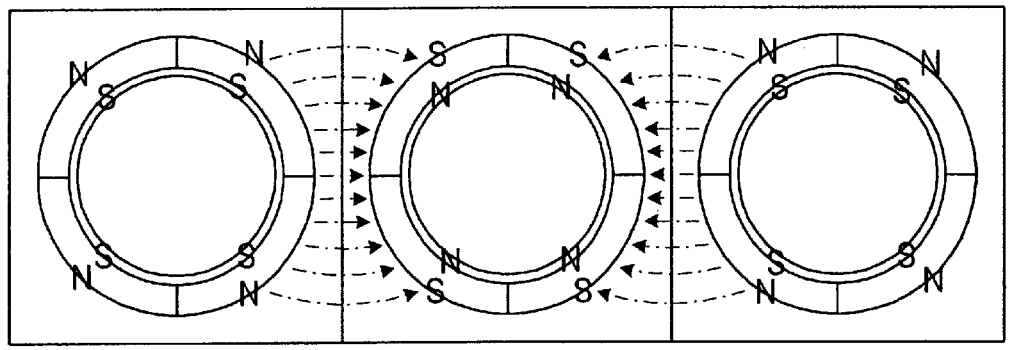
FIG. 3 is a section view of an essential portion for illustrating an example of a variation (lateral three rows, and longitudinal two lines and lateral two rows) of the Embodiment 1.
Figure 3:
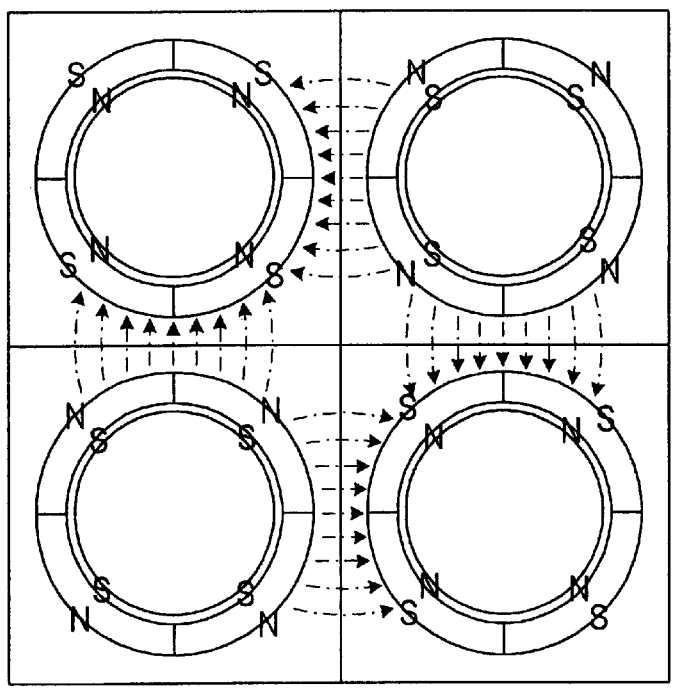

The movable units 1a and 1b configure a movable unit 1. Here, the movable unit 1a of them is provided with a cylindrical hollow portion 3c in the center portion of an outside yoke 3a, which is made of a rectangular-parallelepiped magnetic material. Also, as shown in FIG. 2, magnets 4a magnetized in the radial direction are bonded and fixed so as to cover nearly all surface of the inner peripheral surface of the hollow portion 3c with the same magnetic poles.

Similarly, the movable unit 1b is provided with a cylindrical hollow portion 3c in the center portion of an outside yoke 3b, which is made of a rectangular-parallelepiped magnetic material. As shown in FIG. 2, magnets 4b magnetized in the radial direction is bonded and fixed so as to cover nearly all surface of the inner peripheral surface of the hollow portion 3c with the same magnetic poles.

The fixed units 2a and 2b configure a fixed unit 2. The fixed unit 2a of them has an inside yoke 5a passing through the hollow portion 3c of the outside yoke 3a. Also, the fixed unit 2b has an inside yoke 5b passing through the hollow portion 3c of the outside yoke 3b.

The inside yokes 5a and 5b are made of a magnetic material shaped like a cylindrical column. The outer periphery portions of the inside yokes are insulation-treated, and then respective single coils 6a and 6b are wound in alignment on them along the axial directions of the inside yokes. The magnets 4a and 4b of the outside yokes 3a and 3b are magnetized to a single pole in their surfaces facing the coils 6a and 6b.

The ends of the inside yokes 5a and 5b are magnetically coupled between them by auxiliary yokes 7a and 7b of a magnetic material and fixed to a fixed base 9 by the auxiliary yokes 7a and 7b. The adjacent outside yokes 3a and 3b are coupled by a coupling plate 10 such that the side 3aa of the outside yoke 3b and the side 3bb of the outside yoke 3b may make face-junction with each other so as to reduce magnetic resistance.

By the way, the magnets 4a of the outside yoke 3a are magnetized such that their surfaces facing the coil 6a may be of S poles, and the magnets 4b of the outside yoke 3b are magnetized such that their surfaces facing the coil 6b may be of N poles.

Sliders 10a and 10b mounted to opposite ends of a coupling plate 10 engage with guide rails 8a and 8b, which are arranged on the fixed base 9 side by side, more specifically in parallel, with the inside yokes 5a and 5b. Thereby, in the state where a gap between the inner peripheral surfaces of the magnets 4a and 4b of the outside yokes 3a and 3b and the outer periphery portions of the coils 6a and 6b is held nearly uniform, the outside yokes 3a and 3b are supported so as to be able to slide in the axial directions of the inside yokes 5a and 5b (in the direction of an arrow J). In this embodiment, the sliders 10a and 10b and the guide rails 8a and 8b configures a guide mechanism.

Next, a magnetic circuit will be described in more detail.

A magnetic flux emerging from the N pole face of the magnets 4b of the outside yoke 3b flows from the inside yoke 5b to the auxiliary yoke 7a, from the auxiliary yoke 7a to the adjacent inside yoke 5a, from the inside yoke 5a to the S pole face of the magnets 4a of the outside yoke 3a and then to the N pole face thereof, from the N pole face of the magnets 4a of the outside yoke 3a to the outside yoke 3a, and from the outside yoke 3a to the original outside yoke 3b, and thus circulates to the S pole face of the magnets 4b of the outside yoke 3b, thereby forming a closed magnetic path $\phi$.

The coils 6a and 6b of the inside yokes 5a and 5b are positioned between the magnets 4a and 4b of the outside yokes 3a and 3b, and thus are orthogonal to the magnetic flux of the magnets 4a and 4b. In this situation, by feeding current through the coils 6a and 6b, the movable unit 1, supported by the sliders 1a and 10b and the guide rails 8a and 8b, is moved in the axial direction in accordance with Fleming's left hand rule. By reversing the orientation of current fed through the coils 6a and 6b, the unit 1 moves in the opposite direction. Naturally, the currents flowing through the adjacent coils 6a and 6b are made opposite in orientation to effect the same directions of thrust.

In this way, when the movable units and the fixed units are configured as described above, the whole peripheries of the magnets and the coils contribute to thrust particularly with the outside yokes reduced in weight, thereby permitting a moving-outside-yoke type of linear motor providing excellent volume efficiency.

By the way, the winding starts and winding ends of the coils 6a and 6b keep a small distance from the end portion of the auxiliary yoke 7. This is for preventing a possible problem that when current is fed through the coils 6a and 6b, the outside yokes 3a and 3b become unnecessarily so near to the auxiliary yoke 7 that magnetic flux from the magnets 4a and 4b leaks directly to the auxiliary yoke 7.

Also, the structure of the embodiment does not require a slit portion for the movable coils as is so in a conventional structure, and therefore it is possible to reduce losses in the magnetic circuit. Thus, coil connection and wiring can be performed easily and at low cost.

In this embodiment 1, the combination of two units has been described. However, three or more units arranged in the lateral direction as shown in FIG. 3(a), and also two or more units respectively arranged in the longitudinal and lateral directions as shown in FIG. 3(b) can be implemented in the same manner. In this case, the inner peripheral surfaces of the magnets adjacent to each other are also set to different magnetic poles, and further the orientations of coil current need to be taken into account. However, the embodiment has merit that it can adapt to free combinations of the units, in which the unit may be freely arranged in the longitudinal and lateral directions according to space and thrust of the equipment to be equipped with the linear motor.

Figure 4:
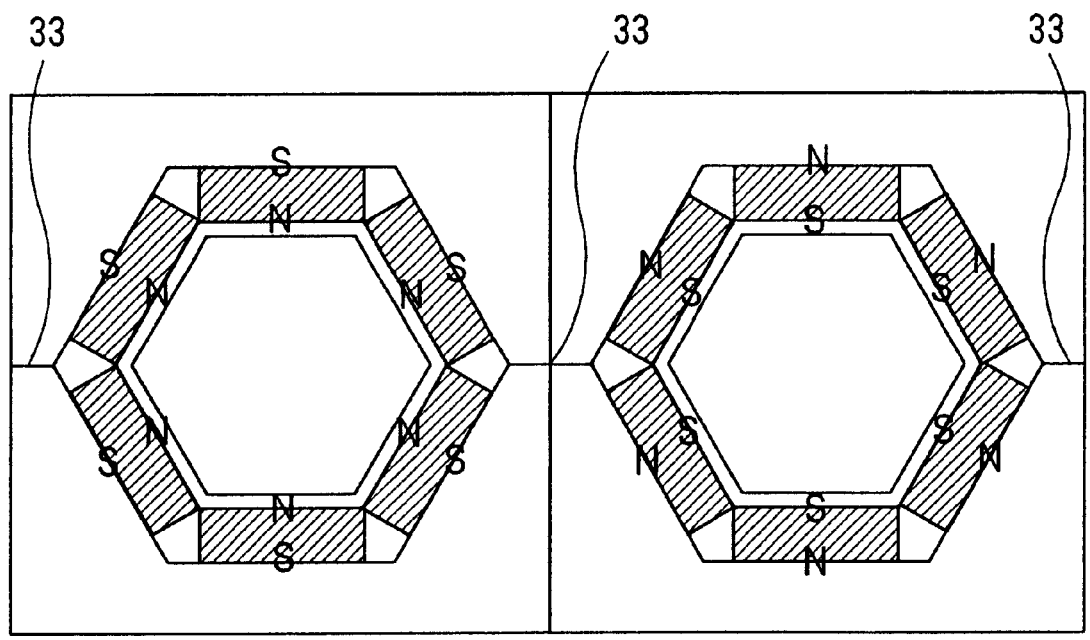
FIG. 4 is a section view of an essential portion for illustrating an example of a variation (inside yoke is shaped like a hexagonal prism) of the Embodiment 1.

Also, although the hollow portions 3c of the outside yokes have been described as hollows shaped like a cylindrical column, the hollow portion may be changed into a hexagonal hole (or octagonal hole), which can be implemented in the same manner. In this case, the inside yoke is preferably of a hexagonal prism (or a octagonal prism) rather than a cylindrical column. FIG. 4 shows the case where the inside yokes 5a and 5b are of a hexagonal prism.

Further, for magnetizing of the magnets, the radial magnetization is best, but the magnets may be divided into a plurality of parts shaped like circular arcs or plates to be magnetized. Particularly, if the inside and outside yokes are shaped like a hexagonal or an octagon and the magnets are similarly divided into plate-like portions of six (or eight) to be magnetized, it is possible to fabricate magnets at low cost. Also, structure components irrelevant to the magnetic circuits are preferably made of nonmagnetic materials.

Particularly, in the case of requiring high-speed reciprocating movement and large thrust, the outside yokes may be fabricated by accumulating press working of electrical sheets of which surfaces has been subjected to insulation treatment in advance. Further, the yokes may be divided into two parts along the radial direction as shown by a dividing line 33 of FIG. 4, thereby permitting reduction of eddy current loss, easy fastening of strong magnets, and also easy assembling works for combining the outside yokes with the inside yokes.

Further, a plurality of pairs of movable units and fixed units may configure a basic unit, and the basic units can be freely combined according to space and characteristics determined by applications. Thereby, it is possible to provide a linear motor that is compact and lightweight and, in addition, permits large thrust and excellent volume efficiency.

(Embodiment 2)

Figure 5:
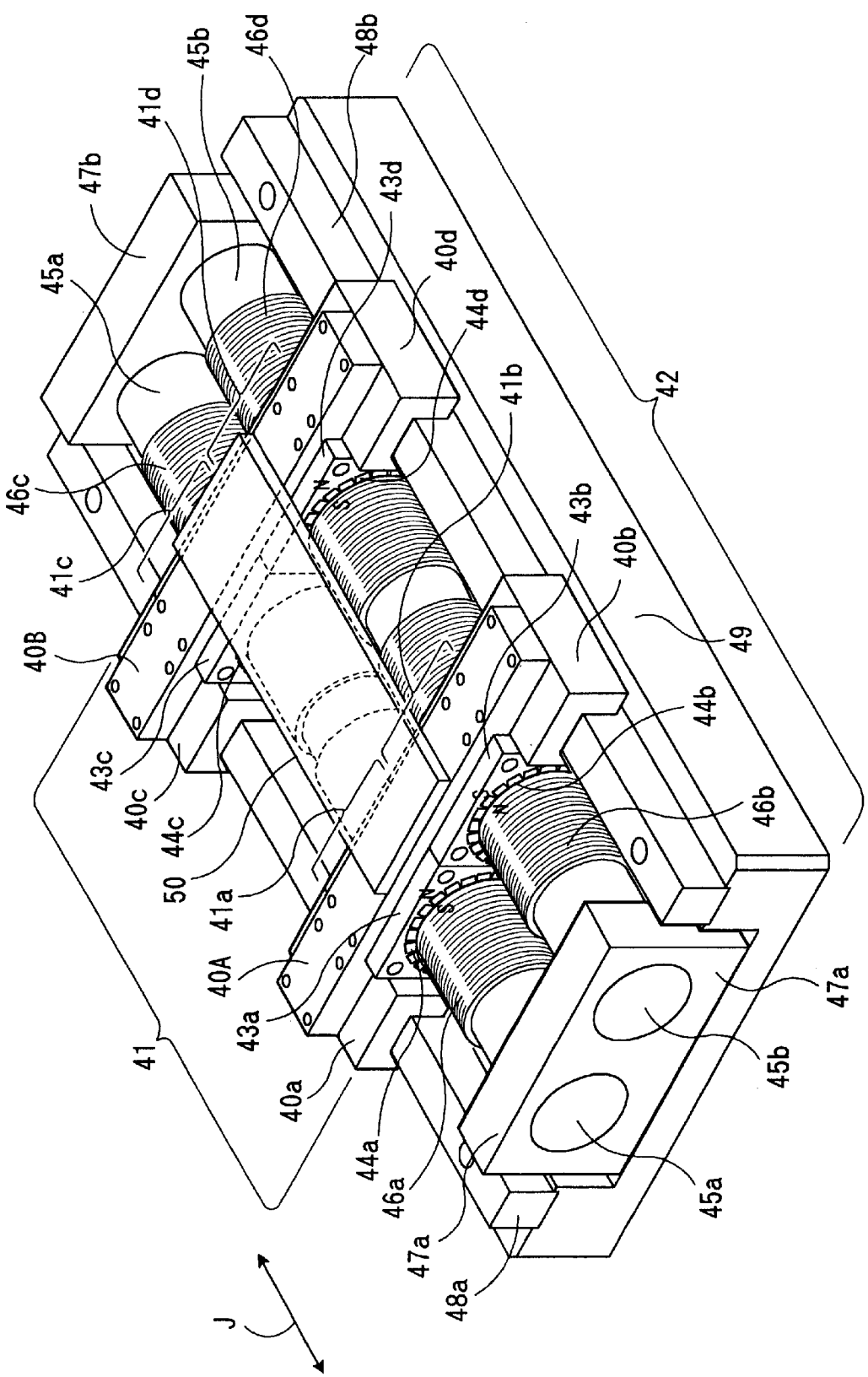
FIG. 5 is a perspective view of a linear motor according to Embodiment 2 of the invention.
Figure 6:
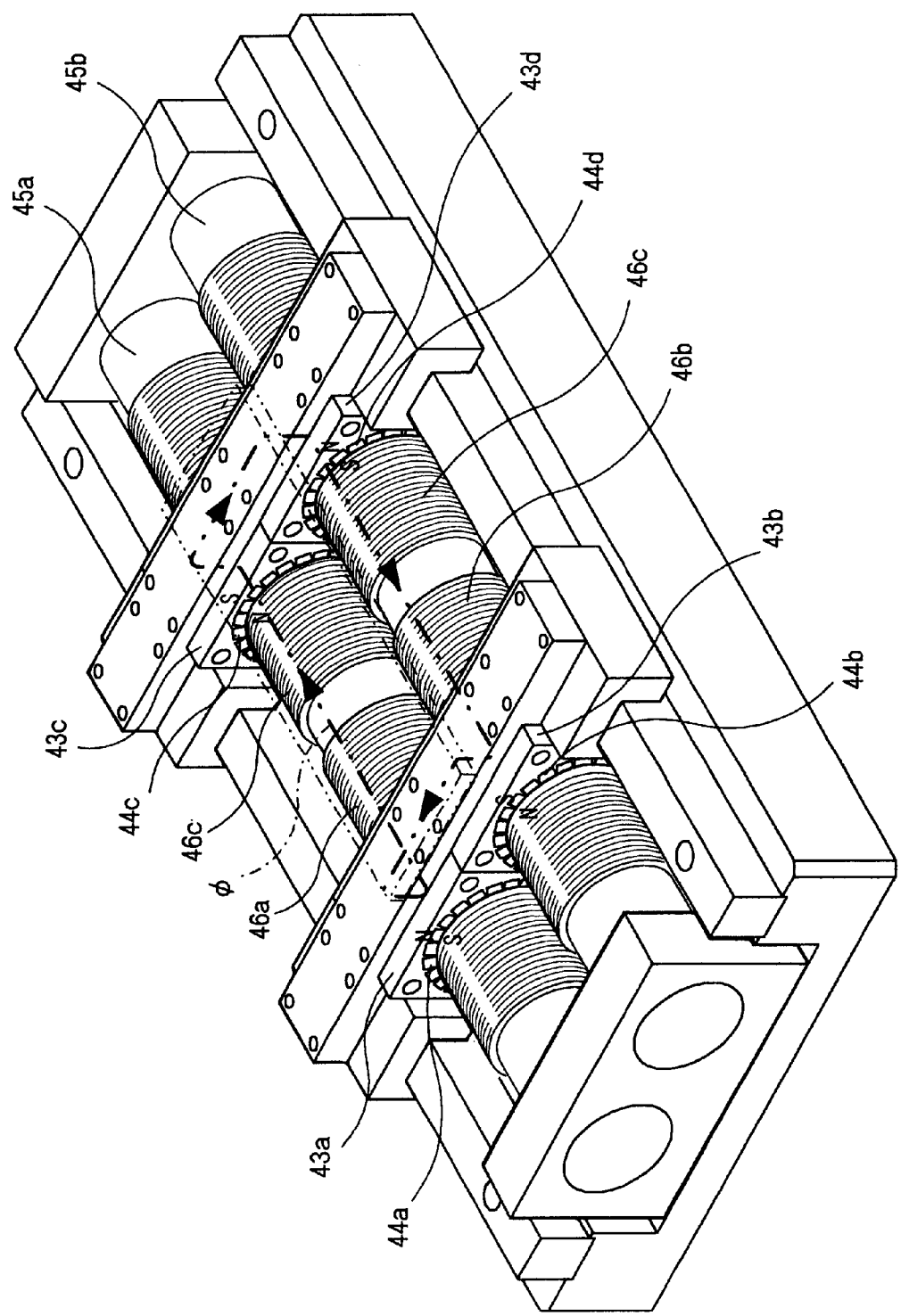
FIG. 6 is a perspective view illustrating a magnetic path of the Embodiment 2.

FIG. 5 and FIG. 6 show a linear motor according to the embodiment 2 of the invention.

In the embodiment 1, one outside yoke 3a is provided for the inside yoke 5a, and also one outside yokes 3b is provided for the inside yoke 5b, and one coil 6a and one coil 6b are respectively provided for the inside yokes 5a and 5b. However, in this embodiment 2, two outside yokes 43a and 43c are provided for an inside yoke 45a, and two outside yokes 43b and 43d are provided for an inside yoke 45b. Further, two coils 46a and 46c are provided for the inside yoke 45a, and two coils 46b and 46d are provided for the inside yoke 45b. In these points, the embodiment 2 is different from the embodiment 1.

Also, a fixed block 42 has two inside yokes 45a and 45b, and a movable block 41 has four outside yokes 43a, 43b, 43c, and 43d. The outside yokes 43a to 43d are provided with cylindrical hollow portions in the center portions thereof, and in the same manner as in the embodiment 1, magnets 44a to 44d magnetized in the radial direction are bonded and fixed so as to cover nearly all the inner peripheral surfaces of the hollow portions with the same magnetic poles.

The opposite end portions of the inside yokes 45a and 45b arranged sided by side, more specifically in parallel, with each other are coupled and fixed to a fixed base 9 by means of coupling blocks 47a and 47b of nonmagnetic materials.

The adjacent outside yokes 43a and 43b are coupled by a coupling plate 40A such that they may make a face-junction with each other to reduce magnetic resistance, in the same manner as in the embodiment 1. Also, the outside yokes 43c and 43d are coupled by a coupling plate 40B to make a face-junction with each other for reducing magnetic resistance.

Sliders 40a and 40b mounted to opposite ends of the coupling plate 40A engage with guide rails 48a and 48b, which are arranged on a fixed base 49 side by side, more specifically in parallel, with the inside yokes 45a and 45b. Thus, in a state in which a gap between the inner peripheral surfaces of the magnets 44a and 44b of the outside yokes 43a and 43b and the outer periphery portions of the coils 46a and 46b is held nearly uniform, the outside yokes 43a and 43b are supported so as to be able to slide in the axial direction of the inside yokes 45a and 45b (in the direction of the arrow).

Sliders 40c and 40d mounted to opposite ends of the coupling plate 40B engage with guide rails 48a and 48b, which are arranged on the fixed base 49 with the inside yokes 45a and 45b. Thus, in a state in which a gap between the inner peripheral surfaces of the magnets 44c and 44d of the outside yokes 43c and 43d and the outer periphery portions of the coils 46c and 46d is held nearly uniform, the outside yokes 43c and 43d are supported so as to be able to slide in the above-described axial direction (in the direction of the arrow). The coupling plates 40A and 40B are coupled to each other by a holding plate 50.

The outside yoke 43a and the outside yoke 43b, and the outside yoke 43c and the outside yoke 43d of the voice coil-type linear motor units adjacent to each other are configured such that the inner peripheral surfaces facing the magnets 44a to 44d may be of different magnetic poles, thereby forming a closed magnetic path $\phi$ by the four outside yokes 43a to 43d, the two inside yokes 45a and 45b, and the magnets 44a to 44d.

In such a configuration, when current is fed through the coils 46a to 46c, the four outside yokes 43a to 43d and the two inside yokes are effected to move relative to each other due to magnetic action caused to occur between a magnetic field generated by the closed magnetic path $\phi$ and the magnets 44a to 44d of the outside yokes 43a to 43d which are adjacent to each other and face-joined, wherein the four outside yokes 43a to 43d are coupled into one piece by the coupling plates 40A and 40B and a holding plate 50. Herein, the inside yokes 45a and 45b configure the fixed side and the outside yokes 43a to 43d slide.

In this embodiment, the sliders 40a to 40b and the guide rails 48a and 48b configure a guide mechanism. The embodiment will be described in more detail.

The coils 46a and 46c and the coils 46b and 46d of a fixed unit 42 are respectively wound in alignment around the inside yokes 45a and 45b in the opposite direction of winding, wherein the outer periphery portions of the inner yokes 45a and 45b have been insulation-treated in advance.

Then, two sets of movable units 41a and 41b and movable units 41c and 41d are combined such that the inner peripheral surfaces of the magnets 44a and 44b adjacent to each other, and the inner peripheral surfaces of the magnets 44c and 44d adjacent to each other, may be respectively of different magnetic poles, i.e. a N pole and a S pole, and thus, the outer peripheral surfaces of the outside yokes 43 adjacent to each other are coupled.

Also, the adjacent coils 44a and 44b and the adjacent coils 44c and 44d of the fixed unit 42 are respectively wound in the opposite winding direction. Further, the holding plate 50 of holding means ensures that the coupled movable units 41a–41b and units 41c–41d are held so as to maintain a distance of length of one movable stroke from each other (a difference between coil length of one section and axial length of one outside yoke). Thereby, the movable units can not be driven over two sections.

A magnetic circuit configured by the two sets of the movable units coupled will be described.

As shown in FIG. 6, a magnetic flux emerging from the N pole face of the magnets 44b of the outside yoke 43b flows from the inside yoke 45b to the S pole face of the magnets 44d of the outside yoke 43d, and then through the S pole face of the magnets 44d, and the magnetic flux emerging from the N pole face of the magnets 44d flows through the outside yoke 43d and the outside yoke 43c, and then through the S pole face of the magnets 44c of the outside yoke 43c, and then flows from the N pole face of the magnets 44c to the inside yoke 45a, and flows from the inside yoke 45a to the S pole face of the magnets 44a of the outside yoke 43a, and the magnetic flux emerging from the N pole face of the magnets 44a flows to the S pole face of the outside yoke 43b, thereby forming a closed magnetic path $\phi$ to circulate.

Here, all the coils 46a to 46d are positioned between the magnets 44a to 44d and the inside yokes 45a and 45b, and are orthogonal to the magnetic flux of the magnets 44a to 44d. In this state, when current is fed through the coils 46a to 46d, the movable units 41a to 41d coupled by the holding plate 50 are guided by the guide rails 48a and 48b to travel in the axial direction (in the direction of the arrow). By reversing the orientation of current flowing through the coils 46a to 46d, the units travel in the opposite direction.

At this time, the two coils of two sections and the four movable coils effect a combined thrust in the same direction. However, magnetomotive forces caused by the passage of current through the coils of two sections are opposite in direction, and therefore magnetic saturation can not occur in the inside yokes.

Therefore, in comparison to the embodiment 1, because of no magnetic saturation, the embodiment 2 can provide a linear motor assuring linearity between current and thrust up to a region of high thrust.

By the way, the hollow portions of the outside yokes and shapes of the inside yokes, shapes of the magnets and magnetization thereof, and configuration of the outside yokes can be implemented alone or in combination thereof in the same manner as in the embodiment 1.

Figure 7:
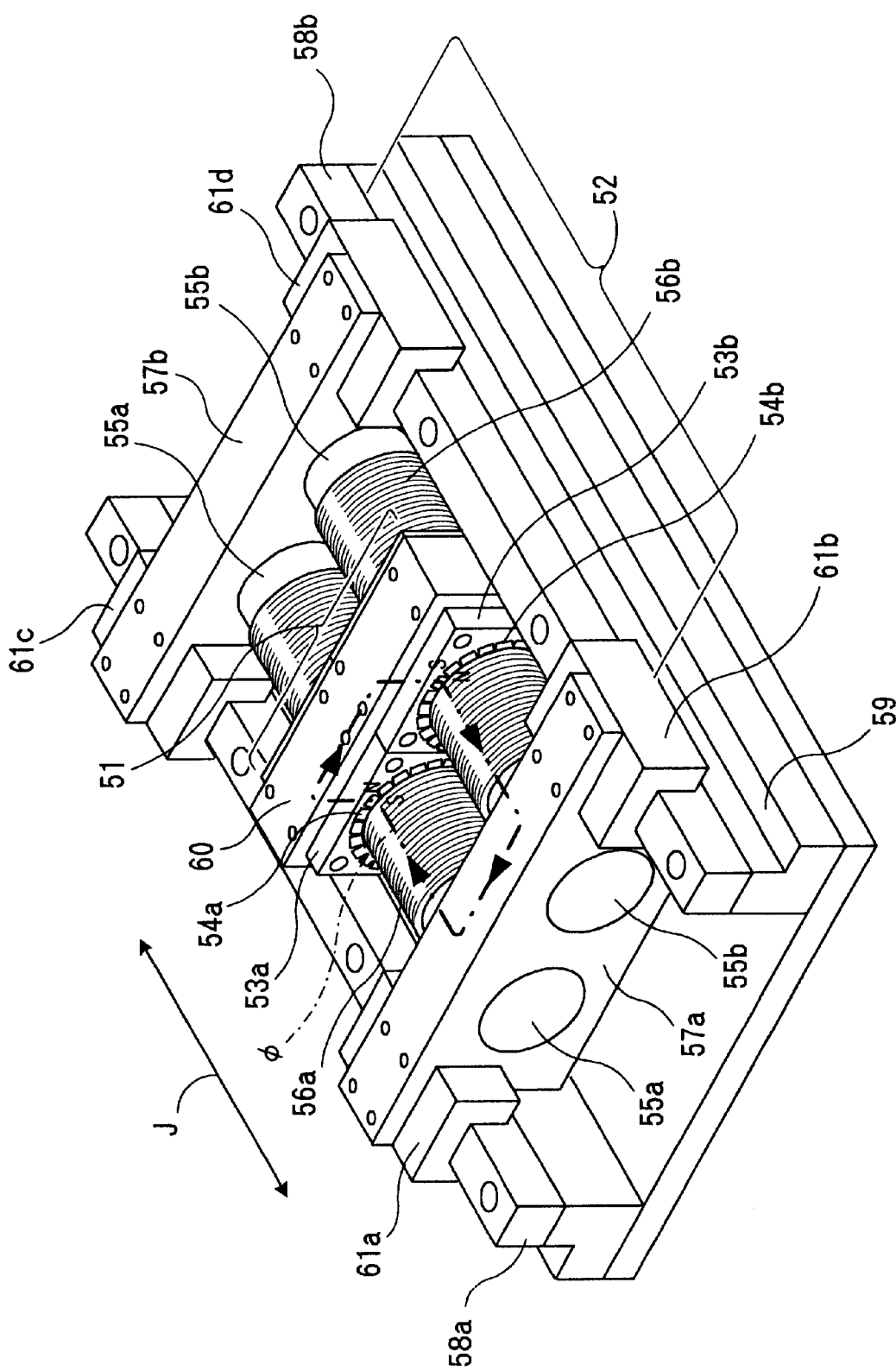
FIG. 7 is a partially broken perspective view of a linear motor according to Embodiment 3 of the invention.

Also, FIG. 5 shows a linear motor of a moving-outside-yoke (magnet) type in which the inside yokes 45a and 45b configure the fixed side and the outside yokes 43a and 43b configure the movable side. However, it is possible to provide a linear motor of a moving-inside-yoke (coil) type having the combination of four fixed units and two movable units, in which the inside yokes 45a and 45b configure the movable side and the outside yokes 43a and 43b configure the fixed side. More specifically, the reverse of the movable side and the fixed side of FIG. 1 is shown in FIG. 7, which shows the embodiment 3 described later. In this way, the reverse of the movable side and the fixed side can be implemented in the same manner.

(Embodiment 3)

FIG. 7 shows a linear motor according to the embodiment 3 of the invention.

In the embodiment 1, the inside yokes 5a and 5b configure a fixed side unit 2, and the outside yokes 3a and 3b configure a movable side unit 1. In contrast, in the embodiment 3, inside yokes 55a and 55b configure a movable unit 52 and outside yokes 53a and 53b configure a fixed unit 51. The others are the same as in the embodiment 1.

The outside yokes 53a and 53b are configured by magnets 54a and 54b bonded and fixed on the inside of hollow portions in the same manner as the outside yokes 3a and 3b of the embodiment 1. The outside yokes 53a and 53b in face-junction are fixed to a fixed base 59 by a mounting block 60.

The inside yoke 55a and the inside yoke 55b are arranged side by side, more specifically in parallel, and opposite ends of the inside yokes 55a and 55b are coupled by auxiliary yokes 57a and 57b, wherein a coil 56a and coil 56b are respectively wound in alignment around the inside yoke 55a and inside yoke 55b. The auxiliary yoke 57a engages with guide rails 58a and 58b via sliders 61a and 61b which are mounted to opposite ends of the auxiliary yoke 57a, wherein the guide rails 58a and 58b are arranged on the fixed base 59 side by side, more specifically in parallel. The auxiliary yoke 57b engages with the guide rails 58a and 58b via sliders 61c and 61d mounted to opposite ends of the auxiliary yoke 57b.

The configuration of a magnetic circuit and the like including the magnetized states of the magnets 54a and 54b is the same as in the embodiment 1 and so description of them will be omitted.

Because the present embodiment is configured in this way, even though it is of a moving-coil (inside yoke) type, the outside yoke does not cover the whole inside yokes. Therefore, consideration to mechanism such as slits is unnecessary and loss is not produced in the magnetic circuit, and thus the embodiment can be made at low cost.

(Embodiment 4)

Figure 8:
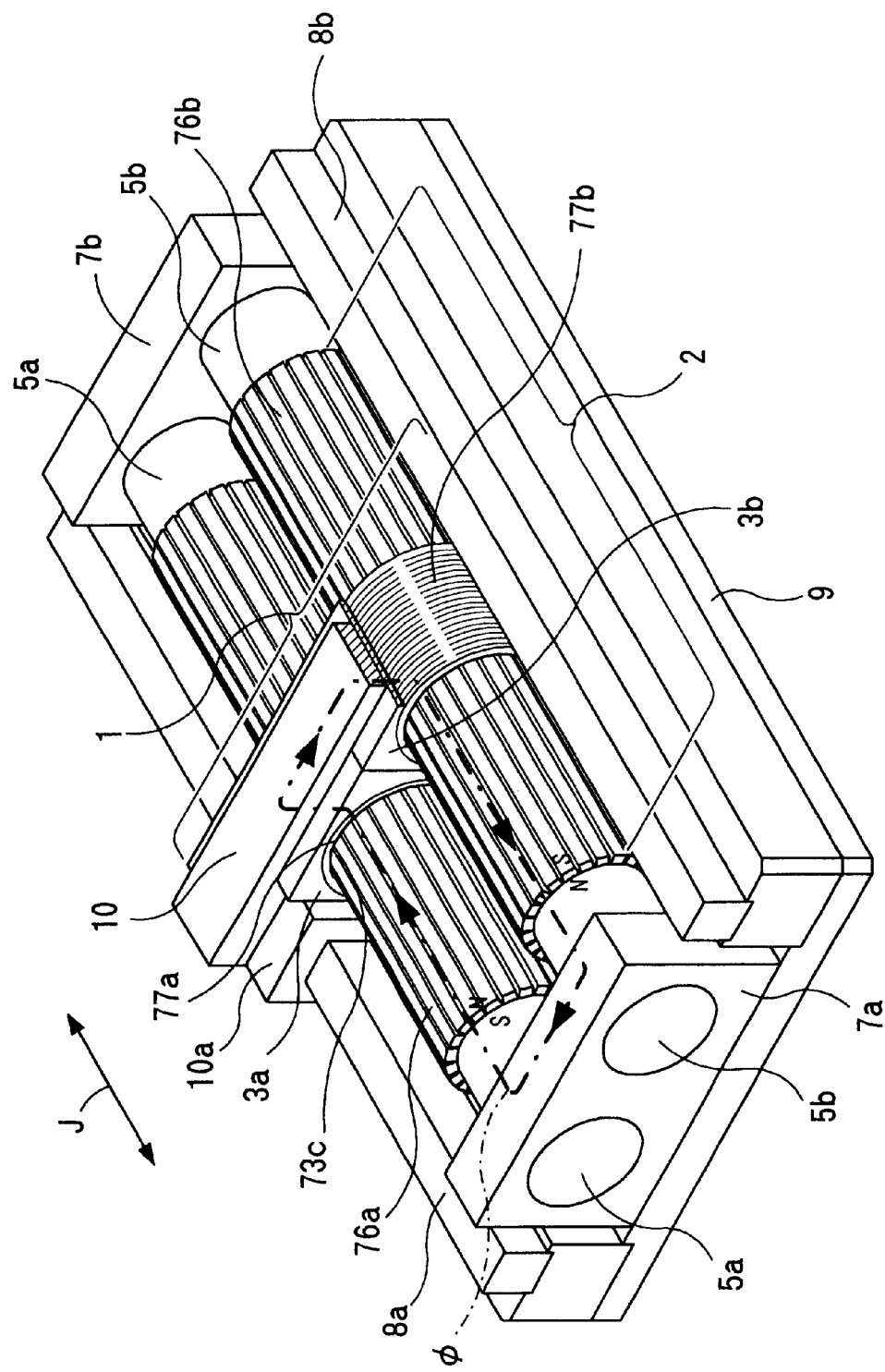
FIG. 8 is a partially broken perspective view of a linear motor according to Embodiment 4 of the invention.

FIG. 8 shows a linear motor according to the embodiment 4 of the invention.

In the linear motor of a moving-outside-yoke type according to the embodiment 1 shown in FIG. 1, the coils 6a and 6b are wound around the inside yokes 5a and 5b and the magnets 4a and 4b are provided for the outside yokes 3a and 3b. However, in a moving-outside-yoke type shown in the embodiment 4, magnets 76a and 76b are bonded and fixed on the inside yoke 5a and 5b. Also, coils 77a and 77b are provided in a hollow portion 73c of the outside yokes 3a and 3b.

FIG. 8 shows a diagram in which one side of the coupling plate 10 is broken to allow a view of the coil 77b, but the coupling plate 10 engages with the guide rails 8a and 8b via the sliders 10a and 10b in the same manner as in FIG. 1 showing the embodiment 1.

The magnets 76a covering the peripheral surface of the inside yoke 5a are magnetized such that their surfaces facing the coils 77a may be N pole faces. The magnets 76b covering the peripheral surface of the inside yoke 5b are magnetized such that their surfaces facing the coils 77b may be S pole faces.

With a magnetic circuit, a magnetic flux emerging from the N pole faces of the magnets 76a covering the peripheral surface of the inside yoke 5a flows through the outside yoke 3a and the outside yoke 3b to the S pole faces of the magnets 76b covering the peripheral surface of the inside yoke 5b, and the magnetic flux emerging from the N pole faces of the magnets 76b flows through the inside yoke 5b and the auxiliary yoke 7a, and flows from the inside yoke 5a to the S pole faces of the magnets 76a, thus forming a closed magnetic path φ to circulate.

In such a configuration, when current is fed through the coils 77a and 77b, the movable unit 1 moves in the axial direction (in the direction of the arrow J). By reversing the orientation of current flowing through the coils 77a and 77b, the movable unit 1 moves in the opposite direction.

By the way, as FIG. 7 shows embodiment in which the movable side and the fixed side of FIG. 1 are reversed. Likewise, it is clear that in the case of the embodiment 4 shown in FIG. 8, the reverse of the movable side and the fixed side can be similarly implemented.

(Embodiment 5)

Figure 9:
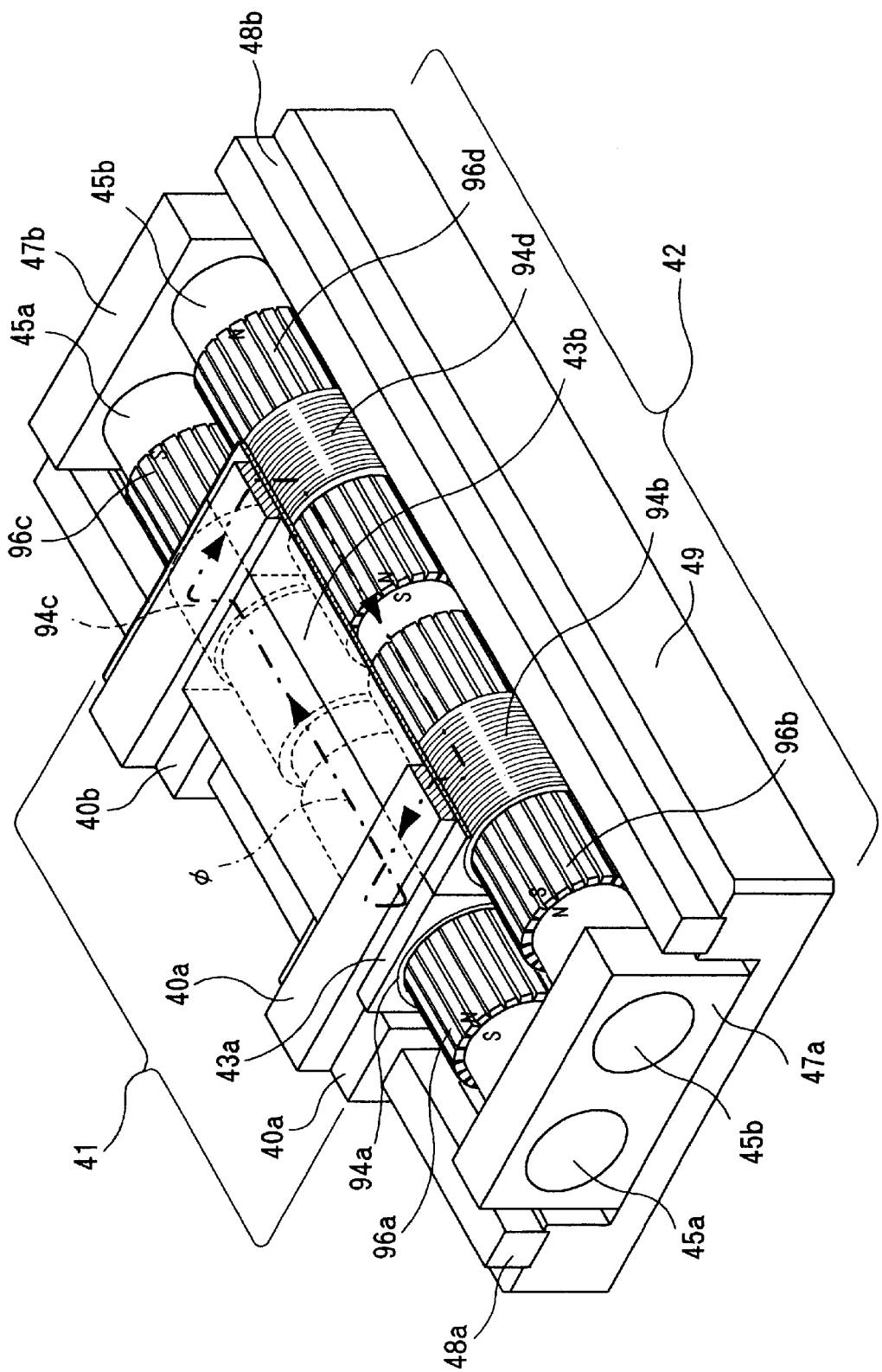
FIG. 9 is a partially broken perspective view of a linear motor according to Embodiment 5 of the invention.

FIG. 9 shows a linear motor according to the embodiment 5 of the invention.

In the linear motor of a moving-outside-yoke type according to the embodiment 2 shown in FIG. 5, the coils 46a to 46d are wound around the inside yokes 45a and 45b and the magnets 44a and 44b are provided for the outside yokes 43a and 43b. On the other hand, a moving-outside-yoke type shown in the embodiment 5 comprises a plurality of outside yokes having cylindrical hollow portions, in this case two outside yokes 43a and 43b, two inside yokes 45a and 45b passing through the hollow portions of the outside yokes 43a and 43b, coils 94a and 94c and coils 94b and 94d which are mounted to the inside of the hollow portions of the outside yokes 43a and 43b and separately wound in two separate sections along the axial direction of the inside yokes 45a and 45b, and magnets 96a to 96d mounted so as to cover peripheral surface of the inside yokes 45a and 45b.

The magnets 96a and 96c are individually bonded and fixed on the inside yoke 45a in such manner that they each may cover the peripheral surfaces of two separate sections of the inside yoke 45a. Also, the magnets 96b and 96d are individually bonded and fixed on the inside yoke 45b in such manner that they each may cover the peripheral surfaces of two separate sections of the inside yoke 45b.

FIG. 9 shows a diagram in which one side of coupling plates 40A and 40B is broken to allow a view of the coils 94b and 94d. Here, the coupling plate 40A engages with the guide rails 48a and 48b via the sliders 40a and 40b, and the coupling plate 40B engages with the guide rails 48a and 48b via the sliders 40c and 40d, in the same manner as in FIG. 5 showing the embodiment 2.

The magnets 96a covering the peripheral surface of the inside yoke 45a are magnetized such that their surfaces facing the coil 94a may be N pole faces, and the magnets 96c are magnetized such that their surfaces facing the coil 94c may be S pole faces.

The magnets 96b covering the peripheral surface of the inside yoke 45b are magnetized such that their surfaces facing the coil 94b may be S pole faces, and the magnets 96d are magnetized such that their surfaces facing the coil 94a may be N pole faces.

With a magnetic circuit, a magnetic flux emerging from the N pole faces of the magnets 96a covering the peripheral surface of the inside yoke 5a flows through the outside yoke 43a and the outside yoke 43b to the S pole faces of the magnets 96b covering the peripheral surface of the inside yoke 45b, the magnetic flux emerging from the N pole faces of the magnets 96b flows from the inside yoke 45b to the S pole faces of the magnets 96d, and flows from the N pole faces of the magnets 96d, through the outside yoke 43b and the outside yoke 43a, to the S pole faces of the magnets 96c, and the magnetic flux emerging from the N pole faces of the magnets 96c flows from the inside yoke 45a to the S pole faces of the magnet 76a, thus forming a closed magnetic path φ to circulate.

In such a configuration, when current is fed through the coils 94a to 94b, the movable unit 1 moves in the axial direction (in the direction of the arrow J). By reversing the orientation of current flowing through the coils 94a and 94b, the movable unit 1 moves in the opposite direction.

By the way, the movable unit 41 of this embodiment 5 has two outside yokes, that is, the coils 94a and 94c provided at opposite ends of the outside yoke 43a, and the coils 94b and 94d provided at opposite ends of the outside yoke 43b. However, the movable unit can be configured in such a manner that the coils 94a to 94d may be provided for each individual outside yoke as in the embodiment 2.

This implies that the movable unit 41 of the embodiment 2 may be also configured by two outside yokes in the same manner as in the embodiment 5.

In FIG. 1, FIG. 5, and FIG. 7 of each embodiment described above, the magnets provided in the hollow portions of the outside yokes are configured as annular magnets consisting of a large number of strip-like magnets on the inner peripheral surfaces of the hollow portions. However, each of the embodiments may be configured to have a single annular magnet magnetized into a target pattern of magnetization.

Further, FIG. 9 shows a linear motor of a moving outside-yoke (coil) type in which the inside yokes 45a and 45b configure a fixed side and the outside yokes 43a and 43b configure a movable side. In contrast, it is possible to provide a linear motor of moving-inside-yoke (magnet) type, in which the inside yokes 45a and 45b configure the movable side and the outside yokes 43a and 43b configure the fixed side. More specifically, as FIG. 7 shows the embodiment in which the movable side and the fixed side of FIG. 1 are reversed, it is clear that the reverse of the movable side and the fixed side can be similarly implemented.

(Embodiment 6)

Figure 10:
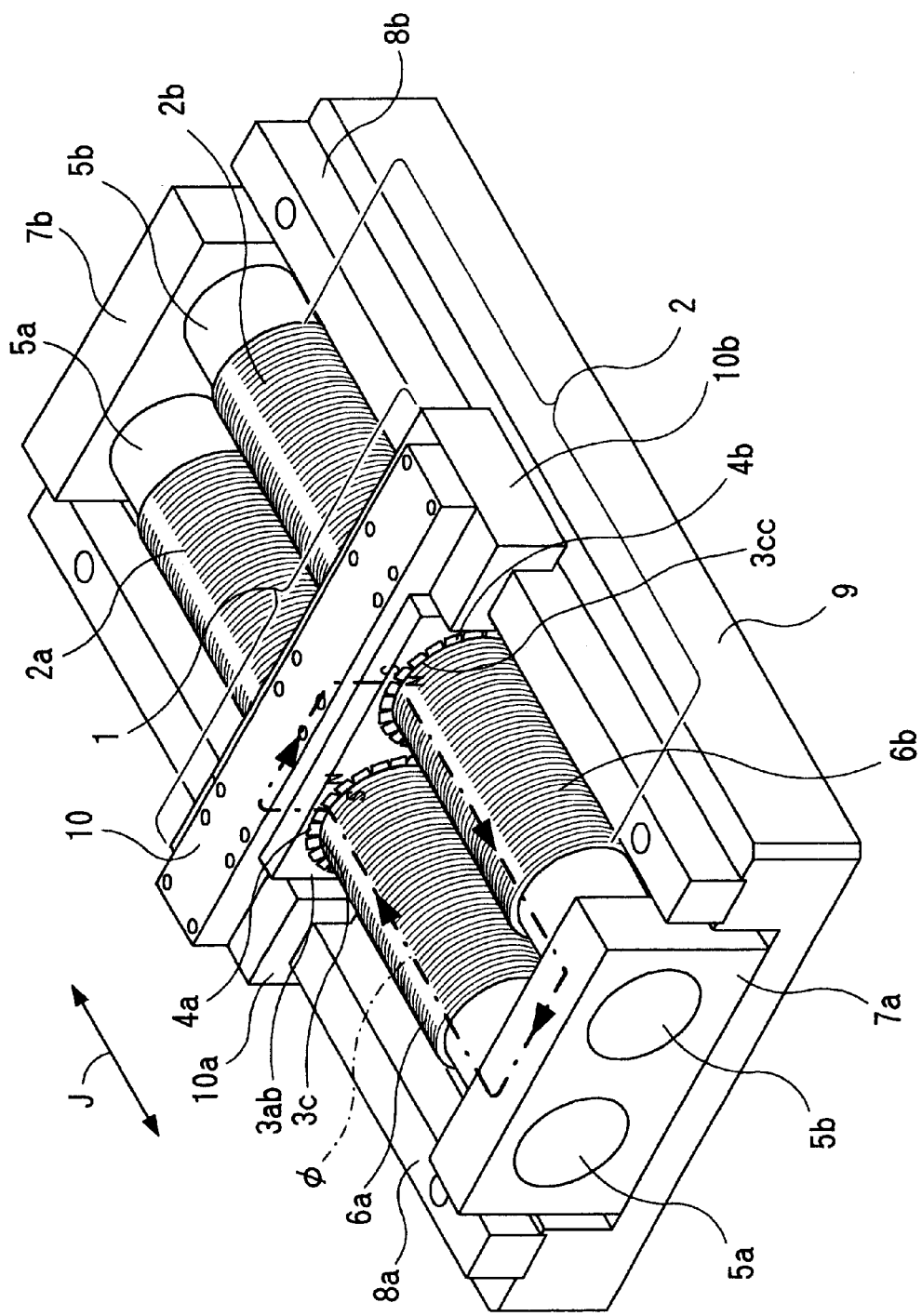
FIG. 10 is a perspective view of a linear motor according to Embodiment 6 of the invention.

Although the movable side is configured by mutual face-joining of the movable unit 1a and the movable unit 1b in FIG. 1, both of them may be integrated into one piece as shown in FIG. 10.

Concretely, as shown in FIG. 10, the integrated structure comprises configuring the movable unit 1 composed of an outside yoke 3ab having a plurality of cylindrical hollow portions 3c and 3cc extending side by side with each other and annular magnets 4a and 4b fixed on the inner peripheral surfaces of the hollow portions, providing the fixed units 2a and 2b consisting of a plurality of column-shaped inside yokes 5a and 5b passing through the hollow portions 3c and 3cc of this movable unit 1 and the coils 6a and 6b wound around the outer periphery portion of each of the inside yokes, coupling the opposite ends of the inside yokes of the fixed units 2a and 2b by means of the auxiliary yokes 7a and 7b, arranging the magnets 4a and 4b such that the inner peripheral surfaces of the magnets may be of different magnetic poles, wherein the magnets 4a and 4b are provided in the hollow portions 3c and 3cc adjacent to each other in the movable unit 1, and providing guide rails 8a and 8b and sliders 10a and 10b between the ends of the inside yokes 5a and 5b and the outside yoke 3ab, wherein the guide rails 8a and 8b act as guide mechanism for holding a nearly uniform gap between the outer periphery portions of the coils 6a and 6b and the inner peripheral surfaces of the magnets 4a and 4b. The others are the same as in FIG. 1.

Although FIG. 10 illustrates an example of a case in which two hollow portions 3c and 3cc are formed in the movable unit 1, the similar configuration as in FIG. 10 may be configured by providing three or four or more cylindrical hollow portions extending side by side with each other correspondingly to the cases shown in FIG. 3(a) or (b). Further, in FIG. 10, the movable unit 1 moves relative to the fixed units 2a and 2b, but, likewise, the fixed units 2a and 2b also may move relative to the movable unit 1 as shown FIG. 12 in the same manner as in the case of FIG. 7.

(Embodiment 7)

In FIG. 5, the outside yoke 43a and the outside yoke 43b are face-joined to each other, and the outside yoke 43c and the outside yoke 43d are face-joined to each other so as to configure the movable side. However, both of the outside yoke 43a and the outside yoke 43b can be integrated into one piece and both of the outside yoke 43c and the outside yoke 43d can be integrated into one piece, thus permitting a configuration shown in FIG. 11.

Figure 11:
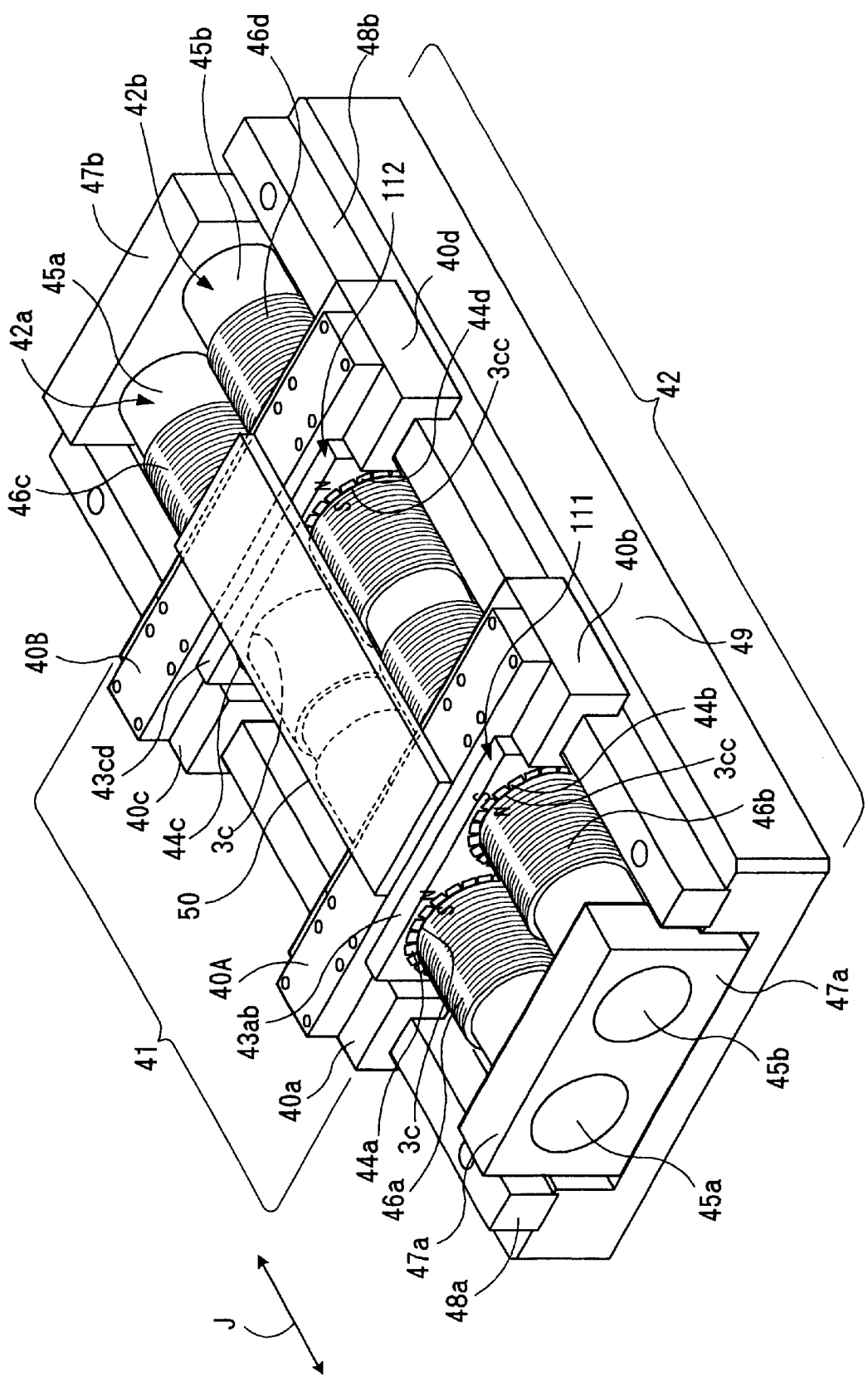
FIG. 11 is a perspective view of a linear motor according to Embodiment 7 of the invention.

Concretely, as shown in FIG. 11, an outside yoke 43ab has a plurality of cylindrical hollow portions 3c and 3cc extending side by side with each other. An outside yoke 43cd has a plurality of cylindrical hollow portions 3c and 3cc extending side by side with each other. The others are the same as in FIG. 5.

Although FIG. 11 illustrates an example of a case in which two hollow portions 3c and 3cc are formed in the outside yokes 43ab and 43cd, the similar configuration as in FIG. 11 may be also configured by providing three or four or more cylindrical hollow portions extending side by side with each other correspondingly to the cases shown in FIG. 3(a) or (b). Further, in FIG. 11, the outside yokes 43ab and 43cd move relative to the inside yokes 45a and 45b, but, likewise, the inside yokes 45a and 45b also may move relative to the outside yokes 43ab and 43cd in the same manner as in the case of changing FIG. 10 to the like of FIG. 12.

(Embodiment 8)

Figure 13:
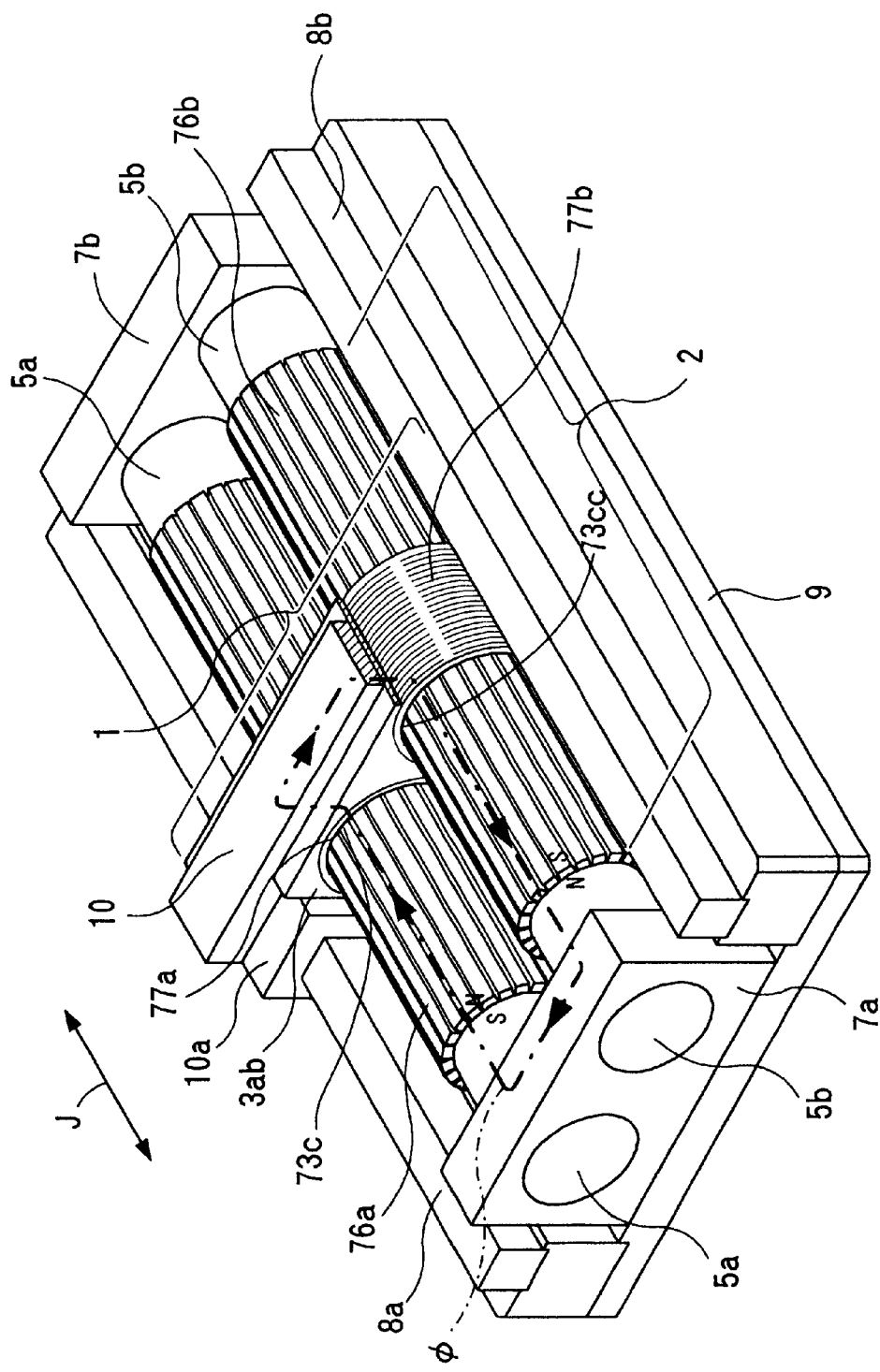
FIG. 13 is a partially broken perspective view of a linear motor according to Embodiment 8 of the invention.

Although, in FIG. 8, the outside yoke 3a and the outside yoke 3b are face-joined to each other so as to configure the movable side, both of the outside yoke 3a and the outside yoke 3b may be integrated into one piece, thus permitting a configuration shown in FIG. 13.

Concretely, as shown in FIG. 13, an outside yoke 3ab has a plurality of cylindrical hollow portions 73c and 73cc extending side by side with each other. The others are the same as in FIG. 8.

Although FIG. 13 illustrates an example of a case in which two hollow portions 3c and 3cc are formed in the outside yoke 3ab, the similar configuration as in FIG. 11 may be also configured by providing three or four or more cylindrical hollow portions extending side by side with each other correspondingly to the cases shown in FIG. 3(a) or (b). Further, in FIG. 13, the outside yoke 3ab moves relative to the inside yokes 5a and 5b, but, likewise, the inside yokes 5a and 5b also may move relative to the outside yoke 3ab as in the case of changing FIG. 10 to the like of FIG. 12.

(Embodiment 9)

In FIG. 9, the outside yoke 43a and the outside yoke 43b are face-joined to each other and the outside yoke 43c and the outside yoke 43d are face-joined to each other so as to configure the movable side. However, both of the outside yoke 43a and the outside yoke 43b may be integrated into one piece, thus permitting a configuration as shown in FIG. 14.

Figure 14:
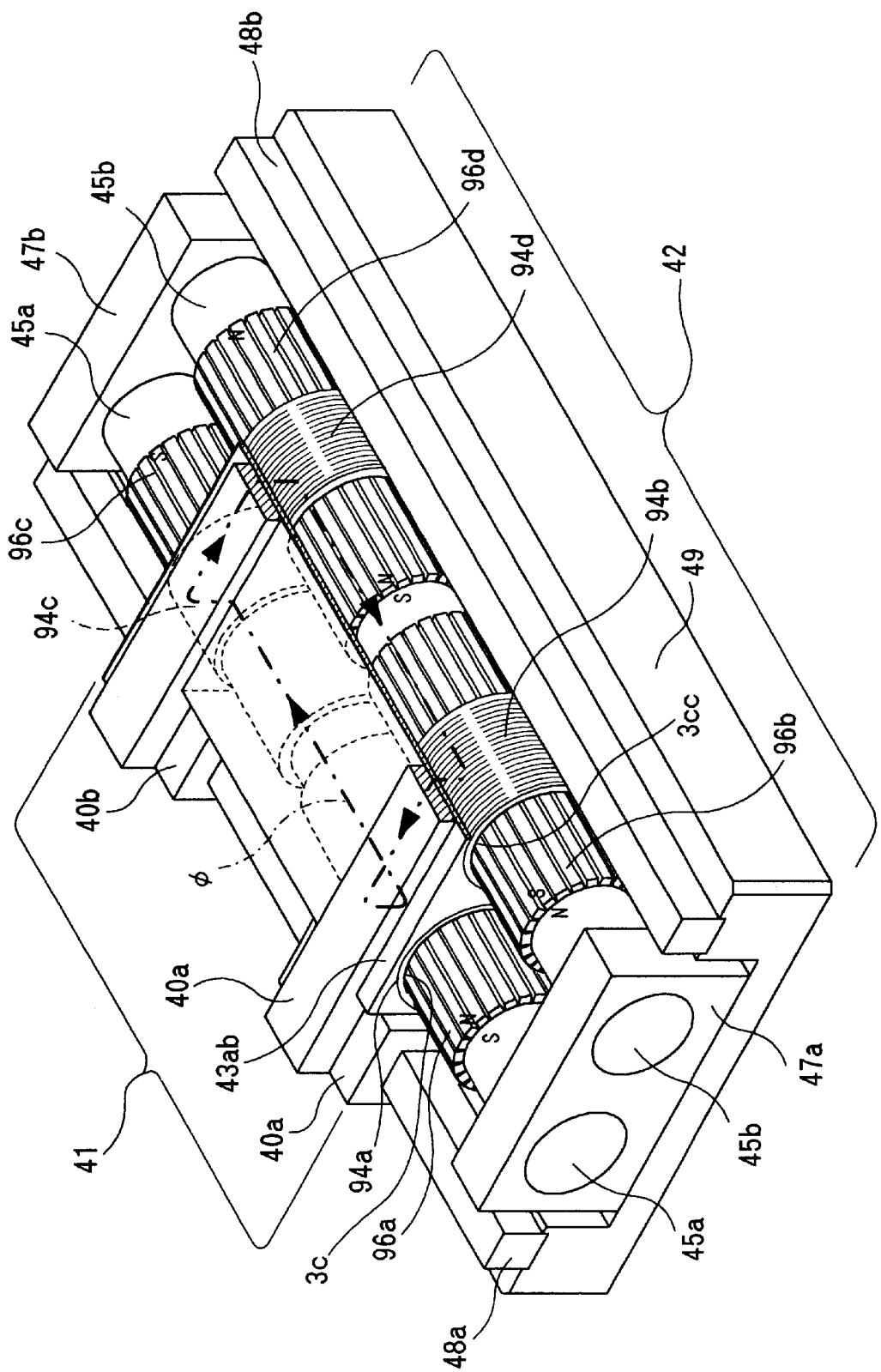
FIG. 14 is a partially broken perspective view of a linear motor according to Embodiment 9 of the invention.
Figure 15:
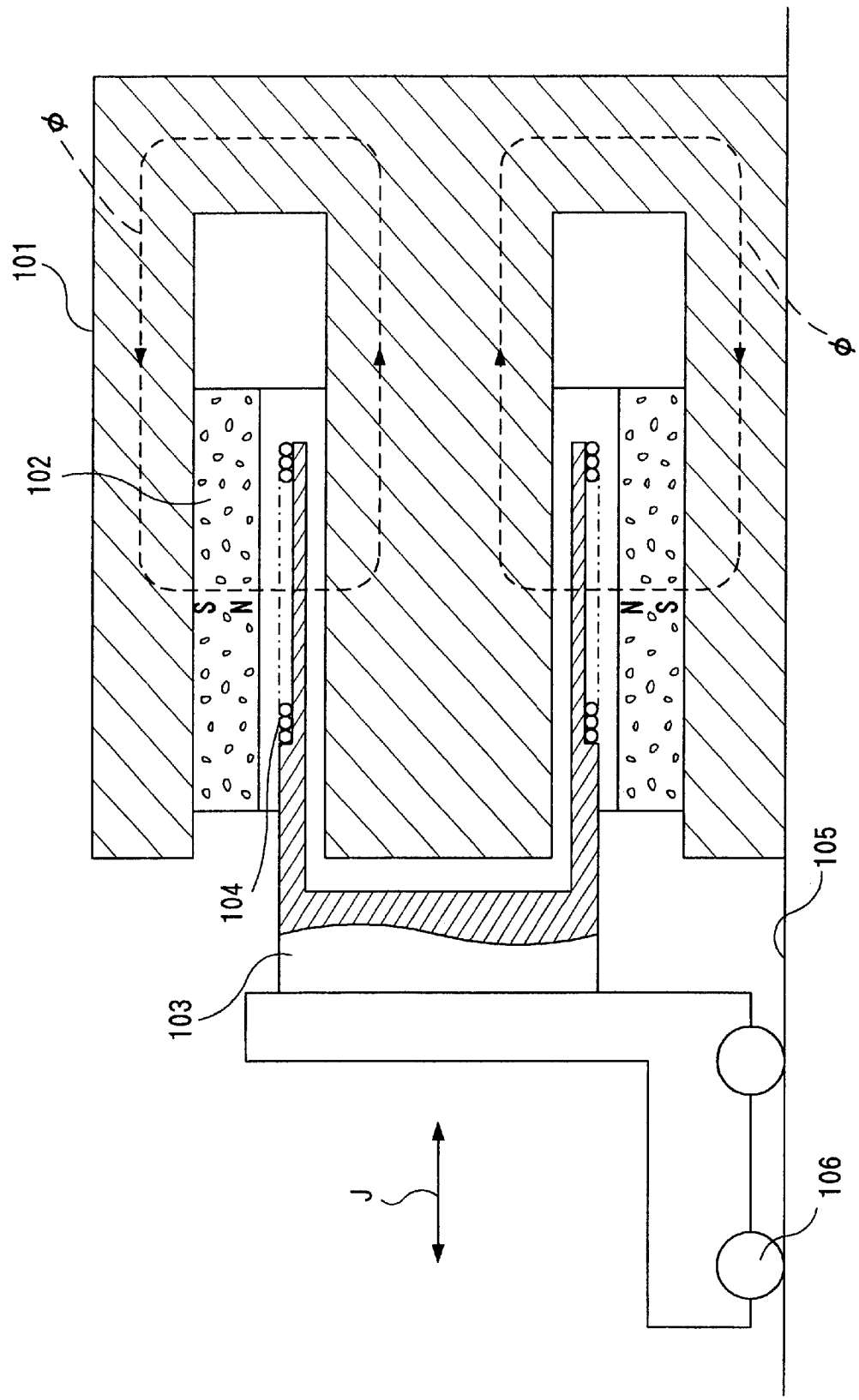
FIG. 15 is a section view of a conventional linear motor.

Concretely, as shown in FIG. 14, the outside yoke 43ab has a plurality of cylindrical hollow portions 3c and 3cc extending side by side with each other. The others are the same as in FIG. 5.

Although FIG. 14 illustrates an example of a case in which two hollow portions 3c and 3cc are formed in the outside yoke 43ab, the similar configuration as in FIG. 14 may be also configured by providing three or four or more cylindrical hollow portions extending side by side with each other correspondingly to the cases shown in FIG. 3(a) or (b).

Figure 12:
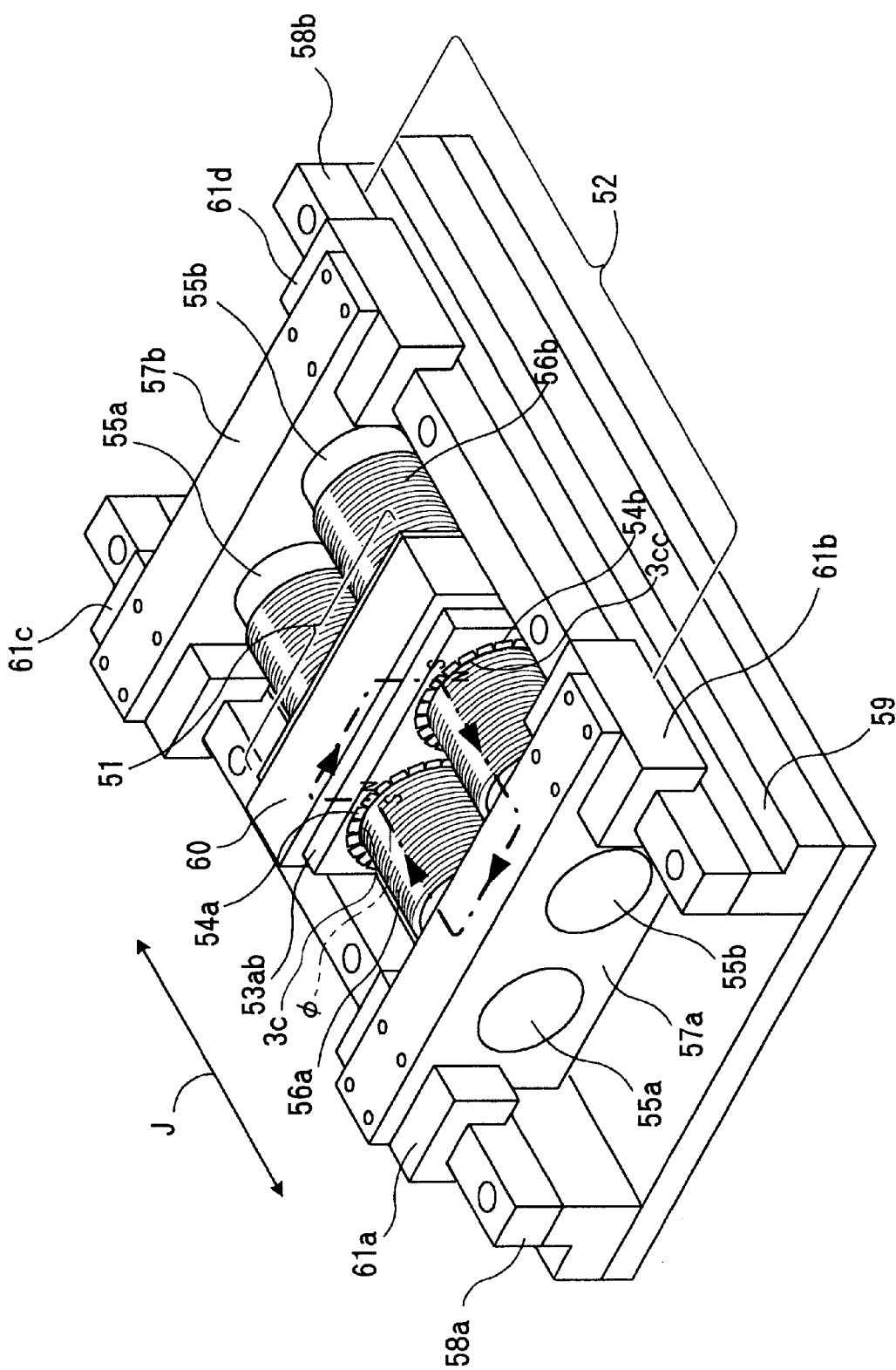
FIG. 12 is a perspective view showing another example of a linear motor according to the Embodiment 6 of the invention.

Further, in FIG. 14, the outside yoke 43ab moves relative to the inside yokes 45a and 45b, but, likewise, the inside yokes 45a and 45b also may move relative to the outside yokes 43ab in the same manner as in the case of changing FIG. 10 to the like of FIG. 12.

Linear motors of the invention can be realized according to each embodiment described above and combinations thereof, and, concretely, adopted as a driving source for X-Y tables used in various industrial equipment, thereby permitting realization of smaller size, weight reduction, higher efficiency and the like of the whole devices.

As described above, the invention changes combinations of units to configure a linear motor adaptable to applications and characteristics, and achieves performance required as an industrial linear motor including relatively high output power, small size and light weight, large thrust, and high efficiency, despite a voice coil type of linear motor.

What is claimed is:

1. A linear motor configured with a plurality of voice coil-type linear motor units arranged in parallel to each other,
   each of the voice coil-type linear motor units comprising:
      an outside yoke having a cylindrical hollow portion;
      an inside yoke passing through the hollow portion of the outside yoke;
      a coil wound around the inside yoke along an axial direction thereof; and
      a magnet mounted to the inside of the hollow portion of the outside yoke and magnetized to a single pole in a surface facing the coil,
   wherein
      ends of the inside yoke are coupled to an adjacent one of the voice coil-type linear motor units by mean of auxiliary yokes,
      the outside yokes of the voice coil-type linear motor units adjacent to each other are configured such that inner peripheral surfaces of the magnets are of different magnetic poles,
      a closed magnetic path is formed by the inside yokes adjacent to each other, the auxiliary yokes, the outside yokes, and the magnets, and
      by feeding current through the coils of the voice coil-type linear motor units adjacent to each other, the outside yokes and the inside yokes are effected to move relative to each other based on magnetic action caused to occur between a magnetic field generated by the closed magnetic path and the coils.

2. A linear motor configured with a plurality of voice coil-type linear motor units arranged in parallel to each other,
   each of the voice coil-type linear motor units comprising:
      an outside yoke having a cylindrical hollow portion;
      an inside yoke passing through the hollow portion of the outside yoke;
      a coil mounted to the inside of the hollow portion of the outside yoke and wound along the axial direction of the inside yoke; and
      a magnet mounted to the inside yoke and magnetized to a single pole in the surface facing the coil, wherein,
      ends of the inside yoke are coupled to another adjacent one of the voice coil-type linear motor units by means of auxiliary yokes,
      the inside yokes of the voice coil-type linear motor units adjacent to each other are configured such that outer peripheral surfaces of the magnets may be of different magnetic poles,
      a closed magnetic path is formed by the inside yokes adjacent to each other, the auxiliary yokes, the outside yokes, and the magnets, and
      by feeding current through the coils of the voice coil-type linear motor units adjacent to each other, the outside yokes and the inside yokes are effected to move relative to each other based on magnetic action caused to occur between a magnetic field generated by the closed magnetic path and the coils.

3. A linear motor configured with a plurality of voice coil-type linear motor units arranged in parallel to each other, comprising:
   inside yokes arranged side by side;
   coils separately wound in a plurality of sections around the inside yokes along the respective axial direction thereof; and
   outside yokes having cylindrical hollow portions, into which the inside yokes are inserted, and provided with magnets on the insides of the hollow portions correspondingly to the coils separately wound in the plurality of sections, wherein
      the magnets are magnetized to a single pole in surfaces facing the coils, and the outside yokes of the voice coil-type linear motor units adjacent to each other are configured such that inner peripheral surfaces of the magnets may be of different magnetic poles,
      a closed magnetic path is formed by a plurality of the outside yokes, the inside yoke, and the magnets,
      by feeding current through the coils, the outside yokes coupled and the inside yokes coupled are effected to move relative to each other based on magnetic action caused to occur between a magnetic field generated by the closed magnetic path and a magnetic field generated by the coils.

4. A linear motor configured with a plurality of voice coil-type linear motor units arranged in parallel to each other, comprising:
   inside yokes arranged side by side;
   magnets separately provided in a plurality of sections on the inside yokes along the respective axial directions thereof; and
   outside yokes having cylindrical hollow portions, into which the inside yokes are inserted, and having coils wound on the inside of the hollow portions correspondingly to the magnets separately provided in the plurality of sections, wherein
      the magnets are magnetized to a single pole in surfaces facing the coils, and are configured such that the magnets of the voice coil-type linear motor units adjacent to each other may be of magnetic poles different from each other,
      a closed magnetic path is formed by the outside yokes, the inside yoke, and the magnets,
      by feeding current through the coils, the outside yokes coupled and the inside yokes coupled are effected to move relative to each other based on magnetic action caused to occur between a magnetic field generated by the closed magnetic path and a magnetic field generated by the coils.

5. A linear motor, comprising:
   a movable unit comprising an outside yoke having a cylindrical hollow portion and an annular magnet fixed so as to cover nearly all surface of the inner peripheral surface of the hollow portion; and
   a fixed unit comprising a column-shaped inside yoke and a coil wound around an outer periphery portion of the inside yoke, wherein
the movable unit and the fixed unit are arranged side by side, respectively in plural pairs, opposite ends of the plurality of the fixed units are coupled by individual auxiliary yokes, and the outside yokes are face-joined to each other such that the inner peripheral surfaces of the magnets of the movable units adjacent to each other may be of different magnetic poles, and guide mechanisms for holding nearly uniform gaps between the outer periphery portions of the coils and the inner peripheral surfaces of the magnets are provided between the side of the auxiliary yokes and the outside yokes.

6. A linear motor, comprising:
a movable unit comprising an outside yoke having a cylindrical hollow portion and an annular magnet, fixed so as to cover nearly all surface of the inner peripheral surface of the hollow portion; and a fixed unit comprising a column-shaped inside yoke and coils separately wound in two sections around the outer periphery portions of the inside yoke,
wherein
the fixed units is arranged side by side, four movable units are mounted to face the coils of four sections such that the inner peripheral surfaces of the magnets adjacent to each other may be of different magnetic poles, and opposite ends of the fixed units are coupled by coupling blocks, and the outside yokes of two sets of the movable units arranged side by side are face-joined to each other, and the motor further comprises:
holding means for coupling between two face-joined movable units to hold a constant spacing of one movable stroke between them, and
guide mechanisms, provided between the side of the coupling blocks and the outside yokes, for holding uniform gaps between the outer periphery portions of the coils and the inner peripheral surfaces of the magnets.

7. A linear motor, comprising:
a fixed unit comprising an outside yoke having a cylindrical hollow portion and an annular magnet fixed so as to cover nearly all surface of the inner peripheral surface of the hollow portion; and a movable unit comprising a column-shaped inside yoke and coils wound around the outer periphery portion of the inside yoke,
wherein
the movable unit and the fixed unit are arranged side by side, respectively in plural pairs, opposite ends of the plurality of the fixed units are coupled by individual auxiliary yokes, and the outside yokes are face-joined to each other such that the inner peripheral surfaces of the magnets of the fixed units adjacent to each other may be of different magnetic poles, and guide mechanisms, provided between the side of the auxiliary yokes and the outside yokes, for holding nearly uniform gaps between the outer periphery portions of the coils and the inner peripheral surfaces of the magnets.

8. A linear motor, comprising:
a fixed unit comprising an outside yoke having a cylindrical hollow portion and an annular magnet fixed so as to cover nearly all surface of the inner peripheral surface of the hollow portion; and a movable unit comprising a column-shaped inside yoke and coils separately wound in two sections around the outer periphery portion of the inside yoke,
wherein
the movable units are arranged side by side, four fixed units are mounted to face the coils of four sections such that the inner peripheral surfaces of the magnets adjacent to each other may be of different magnetic poles, and opposite ends of the movable units are coupled by coupling blocks, the outside yokes of two sets of the fixed units arranged side by side are face-joined to each other, and the motor further comprises,
holding means for coupling between two face-joined movable units and keeping a constant spacing of one movable stroke between them, and
guide mechanisms, provided between the side of the coupling blocks and the outside yokes, for holding nearly uniform gaps between the outer periphery portions of the coils and the inner peripheral surfaces of the magnets.

9. The linear motor according to claim 5, wherein the magnets are divided into a plurality of parts to be fixed on the inner peripheral surface of the hollow portion.

10. The linear motor according to claim 5, wherein the magnet is shaped like a plate, and the inside yoke is shaped like a hexagonal or octagonal prism.

11. The linear motor according to claim 5, wherein the outside yoke is configured by laminating electrical sheets.

12. The linear motor according to claim 5, wherein the outside yoke is divided into two parts along the radial direction.

13. A linear motor, comprising:
an outside yoke having a plurality of cylindrical hollow portions extending side by side with each other;
a plurality of column-shaped inside yokes passing through the hollow portions of the outside yoke;
coils wound around the inside yokes along an axial direction thereof; and
magnets mounted to the inside of the hollow portions of the outside yoke and magnetized to a single pole in surfaces facing the coils,
wherein
opposite ends of the inside yokes are coupled by auxiliary yokes, the magnets provided in the hollow portions adjacent to each other are arranged such that the inner peripheral surfaces of the magnets may be of different magnetic poles, thus forming a closed magnetic path by the inside yokes, the auxiliary yokes, the outside yokes, and the magnets, and
by feeding current through the coils, the outside yokes and the inside yokes are effected to move relative to each other based on magnetic action caused to occur between a magnetic field generated by the closed magnetic path and the coils.

14. A linear motor, comprising:
an outside yoke having a plurality of cylindrical hollow portion extending side by side with each other;
inside yokes passing through the hollow portions of the outside yoke;
coils mounted to the insides of the hollow portions of the outside yoke and wound along an axial direction of the inside yokes; and
magnets mounted to the inside yokes and magnetized to a single pole in the surfaces facing the coils, wherein the ends of the inside yokes are coupled by auxiliary yokes, the inside yokes adjacent to each other are configured such that the outer peripheral surfaces of the magnets may be of different magnetic poles, a closed magnetic path is formed by the inside yokes adjacent to each other, the auxiliary yokes, the outside yoke, and the magnets, and by feeding current through the coils, the outside yokes and the inside yokes are effected to move relative to each other based on magnetic action caused to occur between a magnetic field generated by the closed magnetic path and the coils.

15. A linear motor configured with a plurality of voice coil-type linear motor units arranged in parallel to each other, comprising:

inside yokes arranged side by side;

coils separately wound in a plurality of sections around the inside yokes along respective axial directions of the inside yokes; and outside yokes having a plurality of cylindrical hollow portions extending side by side with each other, into which the inside yokes are inserted, and having magnets provided inside the hollow portions correspondingly to the coils separately wound in the plurality of sections, wherein the magnets are magnetized to a single pole in surfaces facing the coils, and the outside yokes of the voice coil-type linear motor units adjacent to each other are configured such that the inner peripheral surfaces of the magnets may be of different magnetic poles, a closed magnetic path is formed by a plurality of the outside yokes, the inside yoke, and the magnets, and by feeding current through the coils, the outside yokes coupled and the inside yokes coupled are effected to move relative to each other based on magnetic action caused to occur between a magnetic field generated by the closed magnetic path and a magnetic field generated by the coils.

16. A linear motor configured with a plurality of voice coil-type linear motor units arranged in parallel to each other, comprising:

inside yokes arranged side by side;

magnets separately provided in a plurality of sections on the inside yokes along respective axial directions thereof; and outside yokes having cylindrical hollow portions into which the inside yokes are inserted, and having coils wound on the insides of the hollow portions corresponding to the magnets separately provided in the plurality of sections, wherein the magnets are magnetized to a single pole in surfaces thereof facing the coils, and are configured such that the magnets of the voice coil-type linear motor units adjacent to each other may be of magnetic poles different from each other, a closed magnetic path is formed by the outside yokes, the inside yokes, and the magnets, and by feeding current through the coils, the outside yokes coupled and the inside yokes coupled are effected to move relative to each other based on magnetic action caused to occur between a magnetic field generated by the closed magnetic path and a magnetic field generated by the coils.

17. An X-Y table provided with a linear motor according to claim 1.

* * * * *